United States Patent [19]
Kikutani et al.

[11] Patent Number: 5,771,988
[45] Date of Patent: Jun. 30, 1998

[54] MOTOR-DRIVEN VEHICLE

[75] Inventors: Isao Kikutani; Yoshinori Takezawa; Yoshinobu Ishida, all of Kobe, Japan

[73] Assignee: Nabco Limited, Chuoh-ku, Japan

[21] Appl. No.: 655,406

[22] Filed: May 30, 1996

[30] Foreign Application Priority Data

May 30, 1995 [JP] Japan .................................... 7-157158
May 30, 1995 [JP] Japan .................................... 7-157159

[51] Int. Cl.$^6$ .............................. B60K 7/00; B62D 11/04
[52] U.S. Cl. ......................... 180/65.5; 180/6.5; 180/19.3; 180/907
[58] Field of Search ................................... 180/6.48, 6.5, 180/19.1, 19.3, 65.2, 65.5, 315, 320, 907

[56] References Cited

U.S. PATENT DOCUMENTS

| | | | |
|---|---|---|---|
| 4,021,690 | 5/1977 | Burton | 180/65.5 X |
| 5,234,066 | 8/1993 | Ahsing et al. | 180/65.2 X |
| 5,246,082 | 9/1993 | Alber | 180/65.5 |
| 5,366,037 | 11/1994 | Richey | 180/65.5 |
| 5,427,193 | 6/1995 | Avakian | 180/65.5 |
| 5,450,915 | 9/1995 | Li | 180/65.5 |

FOREIGN PATENT DOCUMENTS

| | | |
|---|---|---|
| 315468 | 1/1991 | Japan . |
| 6304204 | 11/1994 | Japan . |
| 6304205 | 11/1994 | Japan . |
| 6304206 | 11/1994 | Japan . |
| 6304207 | 11/1994 | Japan . |
| 6304208 | 11/1994 | Japan . |
| 775219 | 3/1995 | Japan . |

*Primary Examiner*—F. J. Bartuska
*Attorney, Agent, or Firm*—Duane, Morris & Heckscher LLP

[57] ABSTRACT

A motor-driven vehicle includes a vehicle body. A wheel has a fixed axle secured to the vehicle body. A driving arrangement which includes a driving unit and a battery is built in the wheel. A manipulating unit is mounted on the vehicle body, which produces an electrical signal to be supplied to the driving arrangement. The fixed axle has a hollow in it, and a signal line interconnecting the manipulating unit and the driving arrangement is disposed in the hollow in the axle.

21 Claims, 16 Drawing Sheets

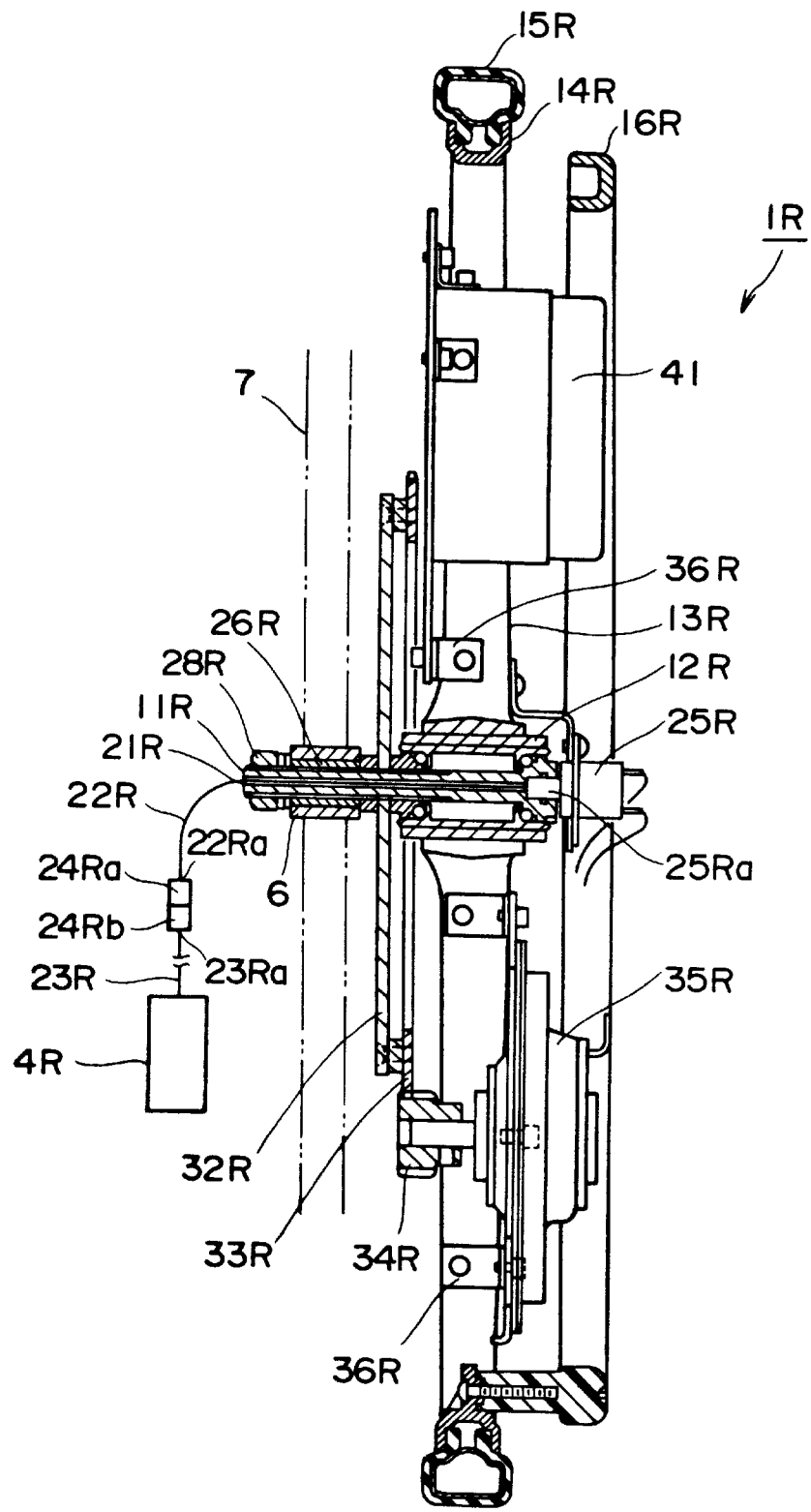
F I G. 1

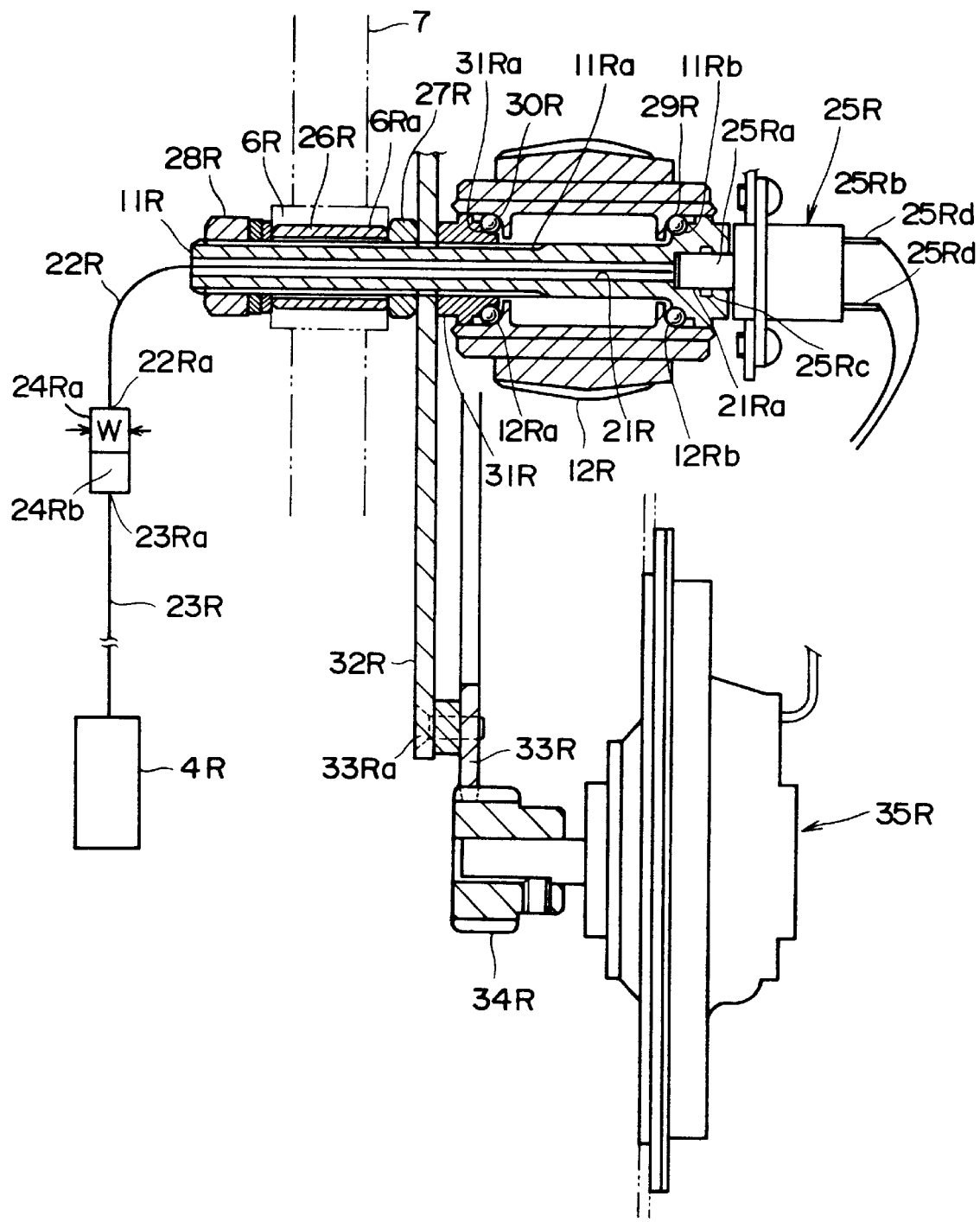
F I G. 2

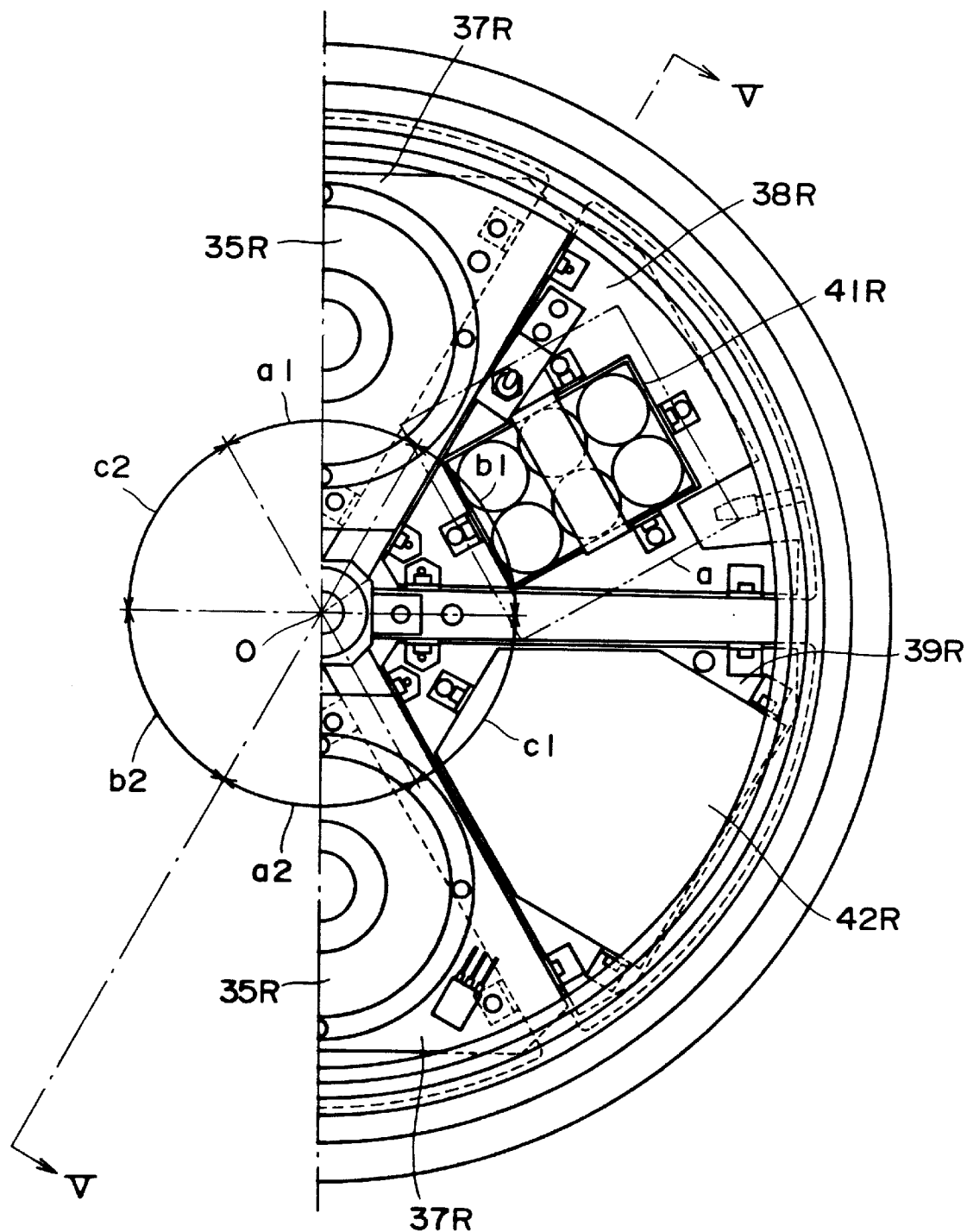
F I G. 4

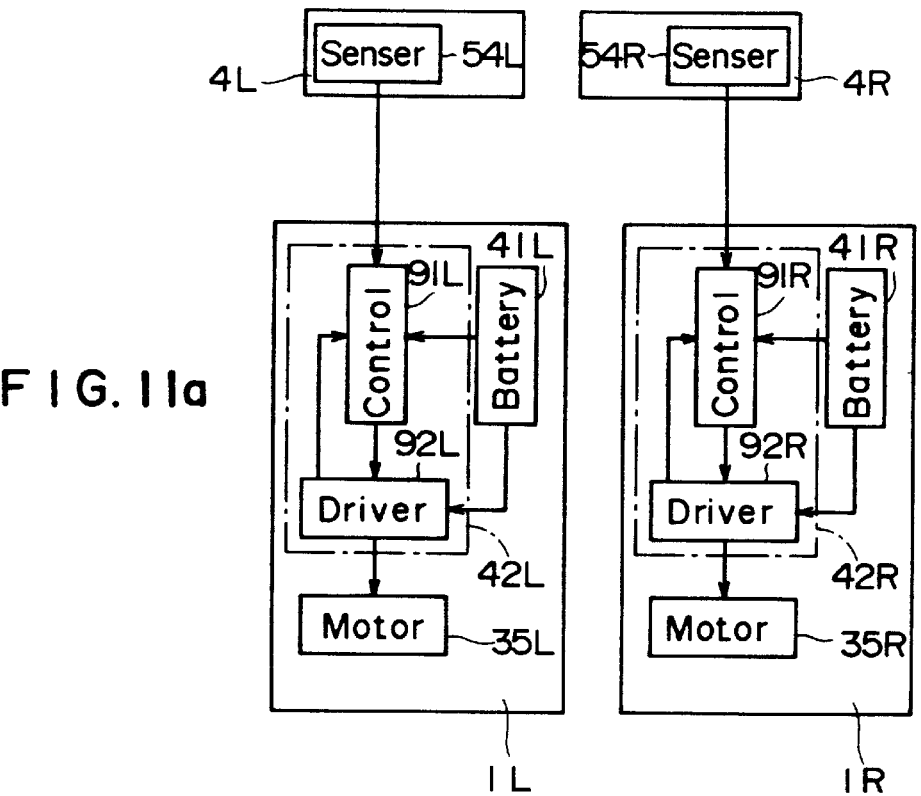
F I G. 11a
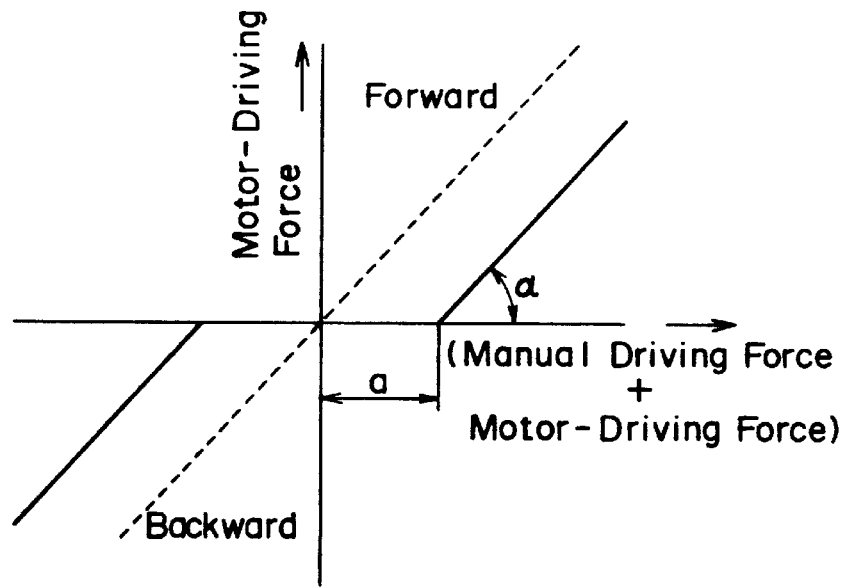
F I G. 11b

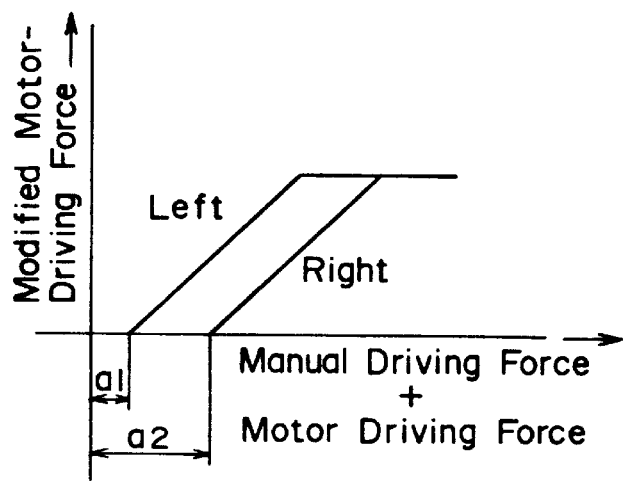
F I G. 14a
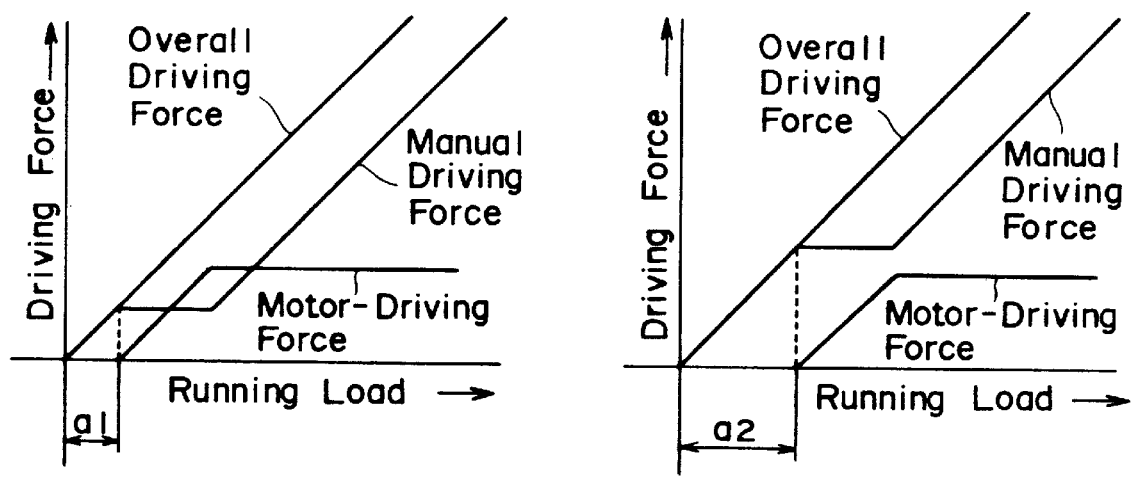
F I G. 14b

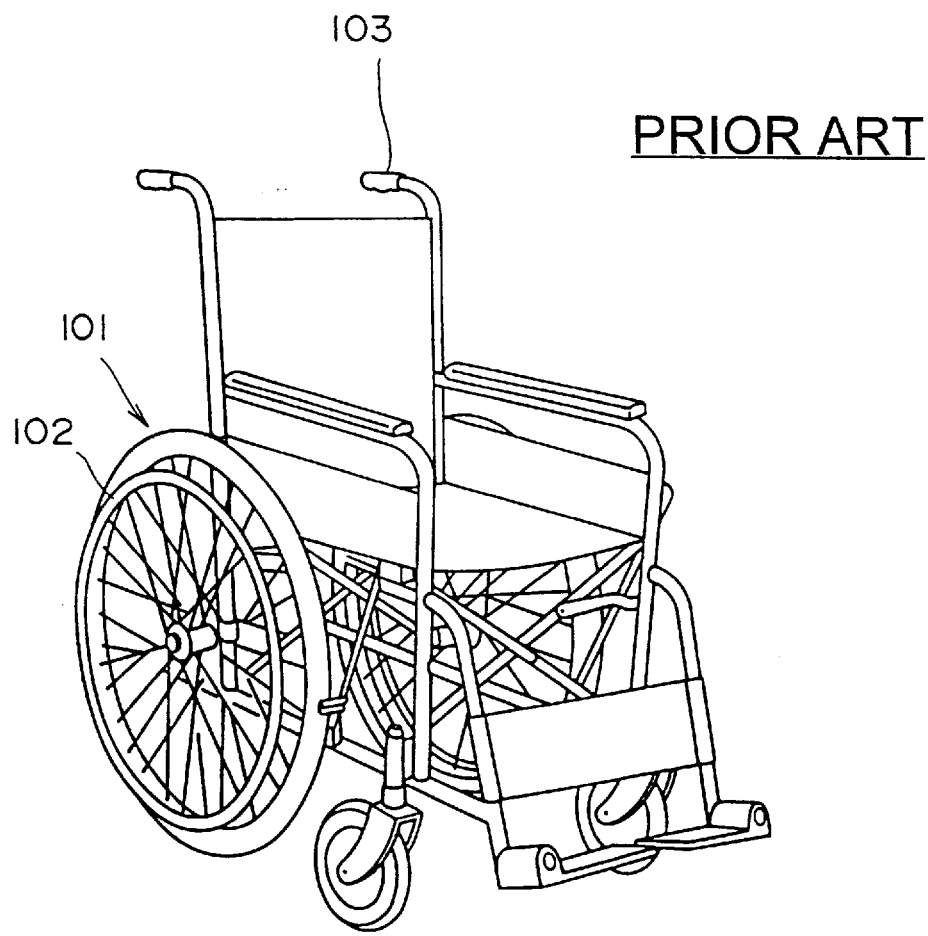
F I G . 16

# MOTOR-DRIVEN VEHICLE

This invention relates to a motor-driven vehicle, such as a motor-driven wheelchair, which can be used by, for example, elderly people, and apparatus for manipulating such vehicle.

BACKGROUND OF THE INVENTION

There are two types of wheelchairs. One is a manually-driven wheelchair, and the other is a motor-driven wheelchair. Physical strength of a person who must use a manually-driven wheelchair may decreases as he becomes older so that he cannot drive his wheelchair for himself. In such a case, it may be desirable to modify his manually-driven wheelchair into a motor-driven one. Japanese Unexamined Patent Publication (KOKAI) No. HEI 7-75219 discloses a driving unit which can be used with a manually-driven wheelchair to modify it into a motor-driven wheelchair. The motor-driven wheelchair with the driving unit disclosed in this Japanese unexamined patent publication includes a manipulating apparatus mounted on a body of the wheelchair, and a light emitter and a light receiver which form a signal transmitting device for transmitting a signal from the manipulating apparatus to the driving unit which is mounted on a wheel of the chair. Japanese Unexamined Patent Publication (KOKAI) No. HEI 7-75656 discloses the use of a RF transmitter and a RF receiver, as a signal transmitting device for transmitting a signal from a manipulating apparatus on a body of a wheelchair to a driving unit on a wheel.

Reliable signal transmission is hardly achieved by the use of a light emitter and light receiver, or the use of a RF transmitter and a RF receiver. In the systems disclosed in the above-referenced Japanese unexamined patent publications, an analog signal generated by the manipulating apparatus is converted into a digital signal, and, then, a signal prepared based on the digital signal is used to emit light toward the light receiver or is transmitted to the receiver. Therefore, an analog-to-digital (A/D) converter must be mounted on the wheelchair body. In addition, the light emitter or the RF transmitter must be mounted on the wheelchair body, with the light receiver or the RF receiver mounted on the wheel.

Like this, modifying a manually-driven wheelchair into a motor-driven one by mounting various components on the wheelchair requires many steps for mounting the components.

As stated above, in order to modify a manually-driven wheelchair into a motor-driven one by mounting various components, a manipulating apparatus must be mounted on a wheelchair body. The above-reference Japanese Unexamined Patent Publication (KOKAI) No. HEI 7-75219 discloses only a manual driving force sensing unit as part of the manipulating apparatus for sensing a force exerted to the wheelchair handle by a helper, but it does not disclose details of the manipulating apparatus. Also, the above-referenced Japanese Unexamined Patent Publication (KOKAI) No. HEI 7-75656 discloses a joystick.

Japanese Unexamined Patent Publication (KOKAI) No. HEI 6-304204 discloses a motor-driven vehicle. A manual driving force sensing unit using a pressure sensor, such as a load cell and a strain gauge, senses a force exerted to the wheelchair by a helper or the person on the wheelchair to drive it, and develops an electrical signal in accordance with the sensed force. The sensing unit is mounted on the wheelchair body. A converter unit produces a drive signal which is the electrical signal from the sensing unit multiplied by a predetermined factor. A control unit for control a motor, which drives the wheel, in accordance with the drive signal from the converter unit.

This motor-driven vehicle utilizes both motor power and human power, but it is more or less difficult to manipulate. Many manually-driven wheelchairs are collapsible. Therefore, it is difficult to use the manipulating apparatus with such collapsible wheelchairs.

In the motor-driven vehicle disclosed in the above-referenced Japanese Unexamined Patent Publication (KOKAI) No. HEI 6-304204, the driving force increases in proportion to a manual driving force applied. Then, if the running load increases, due to, for example, increase in friction resistance or sloping angle of a road surface, or increase in wind pressure, the driving force must be increased, which requires the manual driving force applied by the person driving the wheelchair to be increased, too. If the physical strength of the person who drives the wheelchair is weak, his burden is significant.

In this motor-driven vehicle, a motor driving signal is developed only when a manual driving force exceeds a predetermined value or threshold value. Thus, the point at which the motor driving signal rises is fixed with respect to the manual driving force. A factor which defines the relationship between the manual driving force and the driving force provided by the motor (hereinafter sometimes referred to motor-driving force) is also fixed. Accordingly, if a person who is driving the motor-driven vehicle has a sufficient strength to move the vehicle, the motor-driving force more than required is produced, and the human power cannot efficiently be utilized.

Furthermore, if one arm of a person who drives the vehicle has a larger muscular strength than the other, the driving forces provided by the two motors of the vehicle become unbalanced, so that it is difficult to drive the vehicle straight.

An object of the present invention is to provide a motor-driven vehicle which can be obtained by modifying a manually-driven vehicle by simple work.

Another object of the present invention is to provide a motor-driven vehicle which is suitably an energy-saving motor-driven vehicle which actively utilizes both motor power and human power for driving the vehicle.

A further object of the present invention is to provide a motor-driven vehicle having a motor driven in accordance with the magnitude of a manual driving force applied to the vehicle body by a man, in which vehicle even a person having a smaller strength can increase the driving force for the vehicle, without increasing his burden, and which can easily manipulated by utilizing efficiently a manual driving force which may vary from person to person.

A still another object of the present invention is to provided a motor-driven vehicle manipulating apparatus which does not interfere with the collapsibility of the vehicle.

SUMMARY OF THE INVENTION

A motor-driven vehicle according to the present invention includes a vehicle body. A wheel has an axle secured to the vehicle body. A driving arrangement for driving the wheel to rotate is built in the wheel. The driving arrangement includes a driving unit and a battery. Manipulating means is mounted on the vehicle body. The manipulating means produces an electrical signal to be applied to the driving arrangement. The secured axle has a hollow therein, in which signal lines interconnecting the manipulating means and the driving arrangement.

The secured axle may extend outward beyond the wheel. The signal lines are connected to the driving arrangement, and includes a first signal line led out of the hollow in the axle, and a second signal line extending from the manipulating means. First and second detachably mating connectors are coupled to ends of the first and second signal lines. The first connector coupled to the first signal line has a width which is smaller than the outer diameter of the secured axle.

The wheel may include a rotating section which can rotate about the secured axle. The driving unit is mounted in the rotating section of the wheel. A slip ring assembly through which the signal lines extend is mounted at one end of the hollow in the secured axle.

The slip ring assembly may extend into the hollow from its one end and is mounted on the secured axle with a friction member disposed therebetween.

A bearing unit for bearing a hub included in the rotating unit may be integrally formed with the end portion of the axle where the slip ring assembly is inserted into the hollow.

The rotating section may include a hub mounted to rotate about the secured axle and a plurality of spokes radially equiangularly extending from the hub. The driving arrangement may include a pair of driving units for driving the wheel to rotate, and a pair of batteries for the respective driving units. The driving units are disposed in point symmetry with respect to the center of the secured axle at locations equally spaced from the center of the axle. The two batteries are angularly spaced from the respective driving units, and are disposed in point symmetry with respect to the center of the axle at locations equally spaced from the center of the axle.

A motor-driven vehicle manipulating apparatus according to the present invention is used in a motor-driven vehicle including a vehicle body, a plurality of driving arrangements providing driving force to a plurality of wheels mounted on the vehicle body, and two handle bars extending in the moving direction of the vehicle from the respective two lateral sides of the vehicle body, by which handle bars the vehicle can be moved manually. The manipulating apparatus generates electrical signals which cause the driving arrangements to produce the wheel driving force.

The manipulating apparatus includes mounts fitted over the respective handle bars. The mounts are rotatably held with respect to the handle bars by clamping members. Base members of the manipulating apparatus extend from the respective ones of the handle bars toward the other handle bars. Displaceable hand grips are mounted on the base members in such a manner that they are displaceable back and forth along the direction of movement of the vehicle. The hand grips are of such a size and shape that a person who manipulates the vehicle can grip them. Manual driving force sensing units are coupled to the displaceable hand grips, so that they can produce electrical signals which vary with the manual driving forces exerted onto the displaceable grips.

Each of the manual driving force sensing units may include a displacement sensing unit which detects the amount of displacement of the displaceable hand grip associated with that sensing unit. An elastic member receives a compression force at its one end when the displaceable hand grip is displaced. The other end of each of the elastic members is fixed, so that a repulsive force corresponding to the compression force is generated.

The displaceable hand grips may be disposed to extend in the direction substantially perpendicular to the lateral sides of the vehicle body and substantially in parallel with the ground surface.

Each of the displaceable hand grips may have its one end pivotally supported by one of the base members and has its other end coupled to one of the manual driving force sensing units.

The displaceable hand grips may be disposed with the said one ends located on the handle bar sides and with the other ends located inward of the respective handle bars.

A sleeve may be interposed between the outer surface of each handle bar and the inner surface of the mount fitted over that handle bar, with the clamping member holding the mount to be rotatable relative to the handle bars with the sleeve interposed therebetween. An anchor member is mounted on one of the base members at its one end, which engages with the adjacent end of the other base member to hold the both base members in substantially the same horizontal plane as the displaceable hand grips.

A hinge may be disposed between the adjacent ends of the base members to pivotally interconnect the respective base members.

One wheel may be disposed on each side of the vehicle body. The driving arrangement may provide an independent driving force to each wheel. The motor-driven vehicle manipulating apparatus provides independent electrical signals for providing independent driving forces to the respective wheels associated with the respective handle bars.

According to another aspect of the present invention, a motor-driven vehicle includes a vehicle body to which a wheel is mounted. A driving unit provides a driving force to the wheel. A manipulating unit is disposed on the vehicle body, which unit senses a manual driving force exerted by a person to move the vehicle body and generates an electrical signal representative of the sensed manual driving force. A control unit produces a drive signal for use in supplementing the manual driving force when the electrical signal from the manipulating unit exceeds a predetermined threshold value. The control unit outputs a renewed drive signal which is equal to the sum of the electrical signal and the drive signal minus the predetermined threshold value.

Threshold setting means for setting the threshold value may be connected to the control unit.

One wheel may be disposed on each lateral side of the vehicle body. The driving units provide independent driving forces for the respective wheels. One manipulating unit is disposed on the vehicle for each wheel and produces an electrical signal representative of a manual driving force exerted by a person for driving the vehicle. The control section performs arithmetic operation for the drive signal for each wheel, and includes threshold setting means for each manipulating unit.

Alternatively, the threshold setting means may be provided in the the respective manipulating units.

The control unit may be arranged to produce, as a renewed drive signal, the sum of the electrical signal and the drive signal minus the threshold value, multiplied by a predetermined factor which is a positive integer equal to or smaller than 1. Factor setting means for setting the factor is connected to the control unit.

One wheel may be disposed on each lateral side of the vehicle body. The driving units provide independent driving forces for the respective wheels. One manipulating unit is mounted on the vehicle body for each wheel and provides an electrical signal representative of a manual driving force exerted to the vehicle body by a person driving the vehicle. The control unit performs arithmetic operation for the drive signal for each wheel and is connected to the factor setting means which sets the factor for each wheel.

The control unit may be connected to the threshold setting means which sets the threshold values for the respective manipulating units.

The threshold setting means and the factor setting means may be disposed adjacent to each other in each of the manipulating units.

BRIEF DESCRIPTION OF THE DRAWINGS

FIG. 1 is a cross-sectional view of a wheel used in a motor-driven vehicle according to one embodiment of the present invention;

FIG. 2 is an enlarged cross-sectional view of the wheel shown in FIG. 1;

FIG. 4 is a side view of the part of the wheel shown in FIG. 3 seen from outside of the wheel;

FIG. 11a is an electrical circuit diagram in block of the manipulating apparatus shown in FIG. 6, and FIG. 11b is a graph showing a relationship between the sum of a current manual-driving force and a current motor-driving force, and a renewed motor-driving force;

FIG. 12 shows in detail the manipulating apparatus shown in FIG. 11a;

FIG. 14a is a graph showing a relationship between the sum of a current manual-driving force and a current motor-driving force, and a renewed motor-driving force, when different thresholds are set for right and left side wheels of a motor-driven vehicle, FIG. 14b is a graph showing a relationship between shares of vehicle driving force borne by a human and a motor, and a running load on the vehicle, when a low threshold is set, FIG. 14c is a graph showing a relationship between shares of vehicle driving force borne by a human and a motor, and a running load on the vehicle, when a high threshold is set;

FIG. 16 is a perspective view of a manually-driven wheelchair.

DETAILED DESCRIPTION OF THE INVENTION

Figure 3:
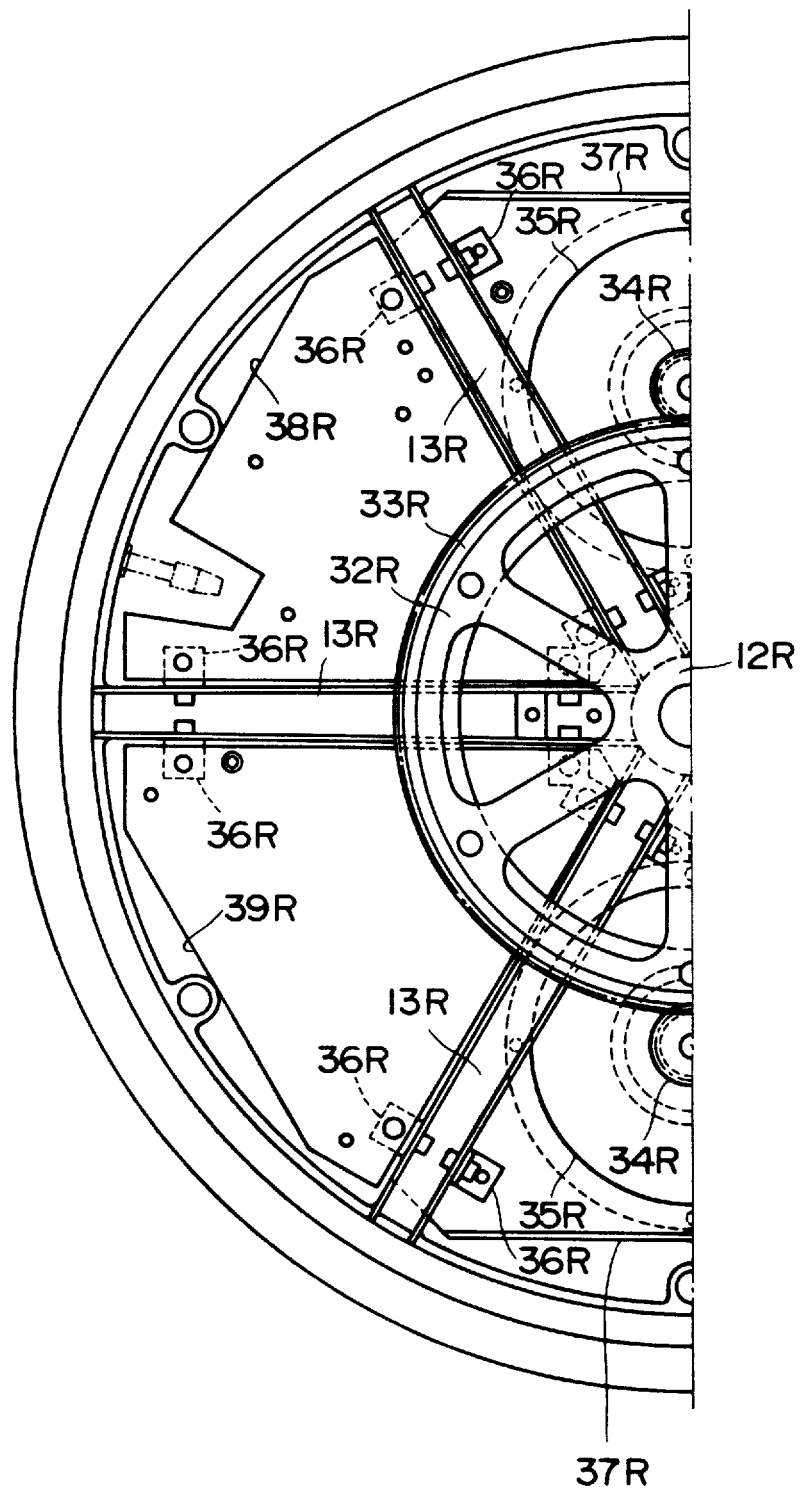
FIG. 3 is a side view of part of the wheel shown in FIG. 1 seen from the vehicle body side.

FIG. 1 shows a wheel 1R of a motor-driven wheelchair according to one embodiment of the present invention, on the right-hand side of a chair body 7 seen from its front. Since a left-side wheel 1L is of the same structure and symmetric with the right-side wheel 1R, it is not described. FIG. 2 shows a part of the wheel 1R in detail.

The wheel 1R includes a fixed axle 11R and a rotary section. The rotary section includes a hub 12R, spokes 13R, a rim 14R, a tire 15R and a hand rim 16R. As will be described later, one end of the fixed axle 11R is secured to the chair body 7. The other end of the fixed axle extends beyond the side of the chair body 7. A hollow 21R is formed in the fixed axle 11R. The hollow 21R extends from one end to the other of the fixed axle 11R. Signal lines 22R extend through the hollow 21R. A connector 24Ra is connected to those ends 22Ra of the signal lines 22R on the chair body side, while the other ends of the signal lines 22R are connected to a shaft 25Ra of a later-mentioned slip ring assembly 25R. The connector 24Ra has a width W (FIG. 2) which is smaller than the outer diameter of the axle 11R. Another connector 24Rb is connected to ends 23Ra of signal lines 23R extending from a manipulating unit 4R, described later, on the chair body side. By interconnecting the connectors 24Ra and 24Rb, the signal lines 22R and 23R are easily interconnected, and by separating the connectors 24Ra and 24Rb, the signal lines 22R and 23R are easily separated.

Referring to FIG. 2, a large diameter hole 21Ra is formed in the end of the hollow 21R on the side opposite to the chair body 7. The shaft 25Ra of the slip ring assembly 25R is fitted into the hole 21Ra. An O-ring 25Rc is fitted over the shaft 25Ra. The O-ring 25Rc acts as a friction member to prevent free rotation of the slip ring shaft 25Ra. In other words, the shaft 25Ra is united with the fixed axle 11R. The slip ring assembly 25 includes a major portion 25Rb which is in contact with the shaft 25Ra and is rotatable relative to the shaft 25Ra. The major portion 25Rb is provided with terminals 25Rd which are connected to a control unit 42R described later with reference to FIG. 11a. The terminals 25Rd are connected to the signal lines 22R through the contact between the shaft 25Ra and the major portion 25Rb. Thus, even when the shaft 25Ra and the major portion 25Rb rotate relative to each other, electrical signals can be transferred from the signal lines 22R to the terminals 25Rd. By the use of the slip ring assembly 25R, the length of the fixed axle 11R can be reduced. The use of the connectors 24Ra and 24Rb, the signal lines 22R, and the slip ring assembly 25R makes it possible to send electrical signals from the manipulating unit 4R on the chair body 7 to the rotating wheel 1R by a simple arrangement, which increases the degree of freedom of arranging components to be mounted on the wheel 1R.

The outer surface of the fixed axle 11R is provided with a thread 11Ra extending from the end on the chair body side to a point beyond the mid-point of the axle 11R. A boss 6R is formed in the chair body 7. A bore 6Ra is formed to extend through the boss 6R. The chair body side end of the fixed axle 11R is inserted into the bore 6Ra with a sleeve 26R interposed between them. Nuts 27R and 28R screwed over the thread 11Ra at locations corresponding to the opposite ends of the boss 6R secures the fixed axle 11R to the chair body 7.

A hub 12R is supported rotatably on the fixed axle 11R at its outer end, outside the chair body 7, by bearing balls 29R and 30R. In order to provide sufficient strength to the fixed axle 11R, which has, at its outer end, the larger diameter hole 21Ra into which the shaft 25Ra of the slip ling assembly 25R is inserted, the outer ends of the fixed axle 11R has a increased outer diameter so as to provide a thickness equal to or larger than the thickness of the axle 11R in its intermediate portion.

An inner race 11Rb for the balls 29R is formed in the larger diameter end portion of the fixed axle 11R. A specially formed nut 31R is screwed over the thread 11Ra of the fixed axle 11R. An inner race 31Ra for the balls 30R is formed in the nut 31R. Outer races 12Ra and 12Rb for the balls 30R and 29R are formed in the hub 12R. By properly adjusting the tightening of the nut 31R, gaps between the inner and outer races suitable for the balls 29R and 30R to roll can be obtained.

A support plate 32R is supported between the nut 31R and the nut 27R. A sun gear 33R is secured to the support plate 32R by means of a bolt 33Ra, with its center aligned with the central longitudinal axis of the fixed axle 11R. Planet gears 34R fitted over and secured to the rotation shafts of motors 35R, which will be described later, engage with the sun gear 33R. The sun gear 33R, the support plate 32R, and the fixed axle 11R are secured to the chair body 7. Accordingly, as the rotating shafts of the motors 35R rotate, the planet gears 34R roll around the sun gear 33R, which causes the wheel 1R to rotate.

Now, a driving arrangement built in the wheel 1R is described.

In FIG. 3, which shows a half of the wheel 1R seen from the chair body side, six spokes 13R (only three of them being shown) extend radially from the hub 12R. The spokes 13R are spaced by an equal angular distance from adjacent ones. A pair of diametrically disposed mounting plates 37R, 38R and 39R are secured to two adjacent ones of the spokes 13R by means of brackets 36R. The mounting plates 37R, 38R and 39R are generally triangular. (In FIGS. 3 and 4, only four mounting plates are seen.)

As shown in FIG. 4, which shows the same part shown in FIG. 3 seen from outside of the wheelchair, the mounting plates 37R, 38R and 39R divide the space within the wheel 1R into six regions a1, a2, b1, b2, c1 and c2. Two motors 35R are mounted on respective ones of the two mounting plates 37R in the regions a1 and a2, in point symmetry with each other at locations on the diametrically opposite sides of the center O of the fixed axle 11R. Two battery units 41R are mounted on respective ones of the two mounting plates 38R in the regions b1 and b2, at locations on the diametrically opposite sides of the center O of the secured axle 11R, which locations are equal spaced from the center O of the axle 11R. Two control units 42R are mounted on respective ones of the two mounting plates 39R in the regions c1 and c2 at locations on the diametrically opposite sides of the center O of the fixed axle 11R, which locations are equally spaced from the center O.

Because each of a pair of motors 35R, a pair of battery units 41R and a pair of control units 41R which constitute the driving arrangement are disposed in point symmetry with respect to the center O of the secured axle 11R, the space within the wheel 1R is efficiently used and, in addition, the balance during rotation of the wheels and, hence, the travelling of the wheelchair is assured.

Each of the motors 35R, the battery units 41R and the control units 42R is enclosed in a waterproof cover to prevent water from penetrating into it.

Even with the motors 35R, the battery units 41R and the control units 42R enclosed in waterproof covers, however, they may be damaged or provide an unsightly appearance to the wheelchair, if they are exposed. It is, therefore, desirable to cover the entirety of the wheel 1R, except the tire, with a cover 45R, as shown in FIG. 5.

Figure 5:
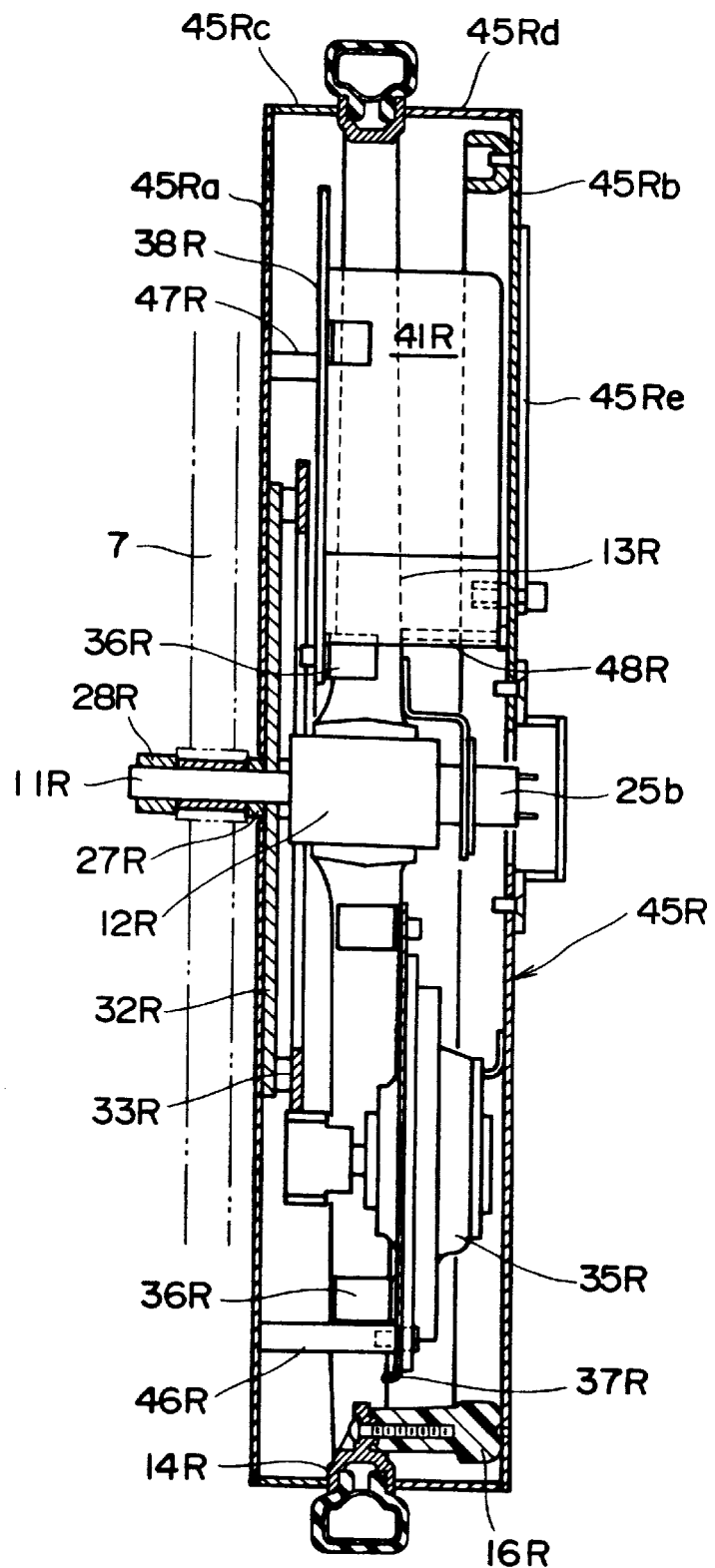
FIG. 5 is a cross-sectional view of the wheel along the line V—V in FIG. 4, with a wheel cover attached thereto.

As shown in FIG. 5, the cover 45R includes a disc member 45Ra on the chair body side of the wheel 1R, which is secured, by bolts, to posts 46R extending from the mounting plates 37R toward the chair body 7 and to posts 47R extending from the mounting plates 38R toward the chair body 7. Another disc member 45Rb is disposed to oppose the disc member 45Ra on the other side of the wheel 1R. The disc member 45Rb is supported by posts 48R attached to the spokes 13 and also secured to the hand rim 16R by bolts. A cylindrical member 45Rc is secured between the outer periphery of the disc member 45Ra and the wheel rim 14R, and another cylindrical member 45Rd is secured between the outer periphery of the disc member 45Rb and the wheel rim 14R.

In the above-described example, the hand rim 16R cannot be used to drive the wheelchair. Therefore, the inner diameters of the cylindrical members 45Rc and 45Rd smaller than the inner diameter of the hand rim 16R may be used so that the hand rim 16R can be used to drive the wheelchair.

With the above described arrangement in which the wheel 1R is covered with the cover 45R, the access to the battery units 41R for maintenance is difficult. To facilitate the access, two openings (not shown) are formed in the disc member 45Rb at locations corresponding to the battery units 41R, and two lids 45Re are attached to close the openings. One of the lids 45Re is indicated by a chain and double-dashed line square in FIG. 4. The other lid is at the diametrically opposite location. By opening these lids 45Re, batteries of the battery units 41R can be easily replaced.

Next, how to mount the above-described wheel 1R to a chair body of a manually-driven wheelchair is explained. Although not explained, the other wheel 1L is mounted in the same manner.

Let it be assumed that the motors 35R, the control units 42R, and the battery units 41R have been already mounted on the wheel 1R and the signal lines 22R have already led out of the hollow 21R of the fixed axle 11R.

First, the nut 28R and the sleeve 26R are removed from the fixed axle 11R. Since the connector 24Ra has an outer diameter smaller than the fixed axle 11R, the nut 28R and the sleeve 26R can be easily detached from the axle 11R with the connector 24Ra passing through the bores in the nut 28R and the sleeve 26R.

As shown in FIG. 2, the sleeve 26R is inserted into the bore 6Ra in the boss 6R of the chair body 7. The bore 6Ra may have a different size for a different type of the wheelchair, but sleeves, 26R, having different outer diameters may be prepared, and an appropriate one of them can be used to adjust the variations in size of the bore. The connector 24Ra is inserted to pass easily through the sleeve 26R, so that the signal lines 22R are led out to the chair body side. Then, the connector 24Ra is caused to pass easily through the bore in the nut 28R, and the nut 28R is screwed tight onto the outer thread 11Ra of the fixed axle 11R. As a result, the fixed axle 11R is secured to the chair body 7.

After the manipulating unit 4R, which will be described later, is mounted onto the chair body 7, the signal lines 23R from the manipulating unit 4R are connected to the signal lines 22R from the wheel 1R by means of the connectors 24Ra and 24Rb.

If a power supply for the manipulating unit 4R is built in it, the signal lines 22R and 23R need to transmit electrical control signals from the manipulating unit 4R to the control unit 42R. In such a case, a power supply line need not be used.

If a power supply for the manipulating unit 4R is not built in it, so that power must be fed to the manipulating unit 4R from the battery units 41R, as a power line which is inserted through the fixed axle 11R, a small diameter power line for small power transmission can be used, since the manipulating unit 4R consumes small power. Accordingly, the diameter of the hollow 21R in the fixed axle 11R can be made small, which can assure the strength of the fixed axle 11R.

In the above-described example, the control unit 42R is described as being mounted in the wheel 1R, but it can be disposed in the manipulating unit 4R.

The manipulating units 4R and 4L to be mounted on the chair body 7 of the manually-driven wheelchair are described with reference to FIGS. 6–9.

Figure 6:
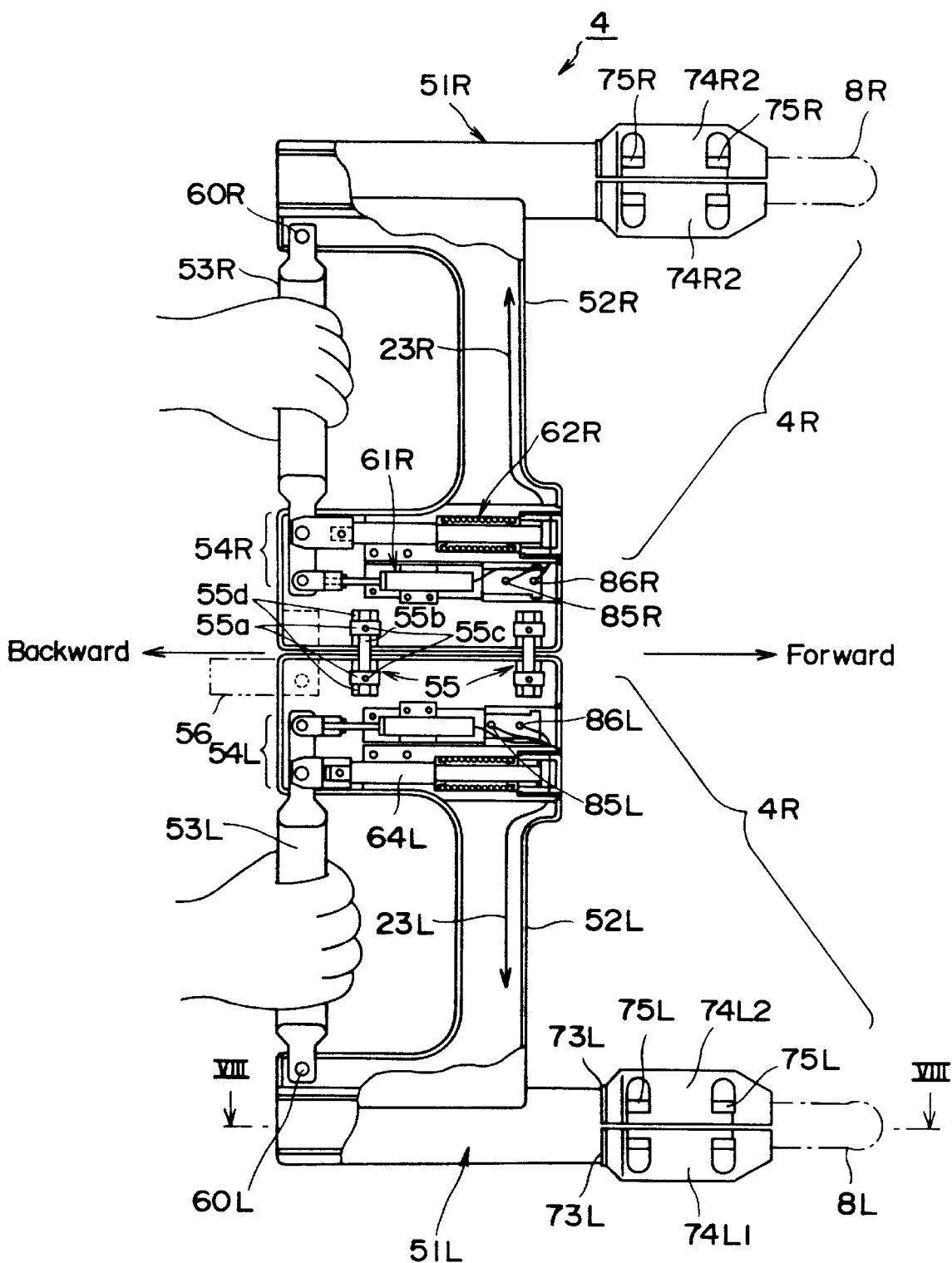
FIG. 6 is a partially broken-away, plan view of a motor-driven vehicle manipulating apparatus according to an embodiment of the present invention.

As shown in FIG. 6, the manipulating units 4R and 4L are mounted between a pair of handle bars 8R and 8L. The handle bars 8R and 8L extend from the rear of the chair body 7 in the direction parallel to the lateral sides of the chair body 7. The manipulating unit 4R is for the right side wheel 1R, and the unit 4L is for the left side wheel 1L. In FIG. 6, a top portion covering the top of each of the manipulating units 4R and 4L.

The manipulating units 4R and 4L have mounts 51R and 51L mounted on the handle bars 8R and 8L. The mounts 51R and 51L are rotatable about the handle bars 8R and 8L. The manipulating units 4R and 4L include U-shaped frames 52R and 52L, respectively. Each of the frames 52R and 52L has a pair of parallel legs. One of a pair of legs (hereinafter referred to an outer leg) of each frame 52R, 52L, is formed integral with the associated mount 51R or 51L. The other legs (hereinafter referred to as inner legs) are disposed adjacent to each other in the space between the handle bars 8R and 8L. Displaceable grips 53R and 53L are mounted in parallel with the ground plane between the outer and inner legs of the respective frames 52R and 52L. The displaceable grips 53R and 53L are displaceable back and forth in the direction parallel with the lateral sides of the wheelchair. Manual driving force sensing units 54R and 54L are coupled to corresponding one ends of the displaceable grips 53R and 53L. The manual driving force sensing units 54R and 54L are enclosed in the inner legs of the frames 52R and 52L.

The manipulating units 4R and 4L are coupled together by means of hinges 55 mounted between the inner legs of the frames 52R and 52L.

Figure 9:
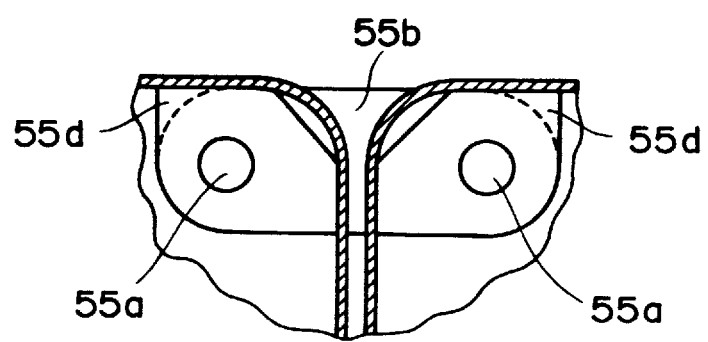
FIG. 9 is an enlarged, cross-sectional view of a hinge used in the apparatus shown in FIG. 6.

As shown in FIGS. 6 and 9, each of the hinges 55 includes a plate 55b which bridges the two inner legs. (Reference numerals are attached to only one of the hinges 55 in FIG. 6 for simplicity, but the other hinge 55 has the same structure.) Shafts 55a are disposed at locations near the opposite ends of each plate 55b. The shafts 55a extend in parallel with the handle bars 8R and 8L. The shafts 55a are secured to the plates 55b by means of securing screws 55c. Brackets 55d formed integral with the respective inner legs of the frames 52R and 52L are pivoted on the respective shafts 55a, which makes the frames 52R and 52L pivotable about the respective shafts 55a. Thus, the manipulating apparatus including the manipulating units 4R and 4L can be folded.

Figure 7:
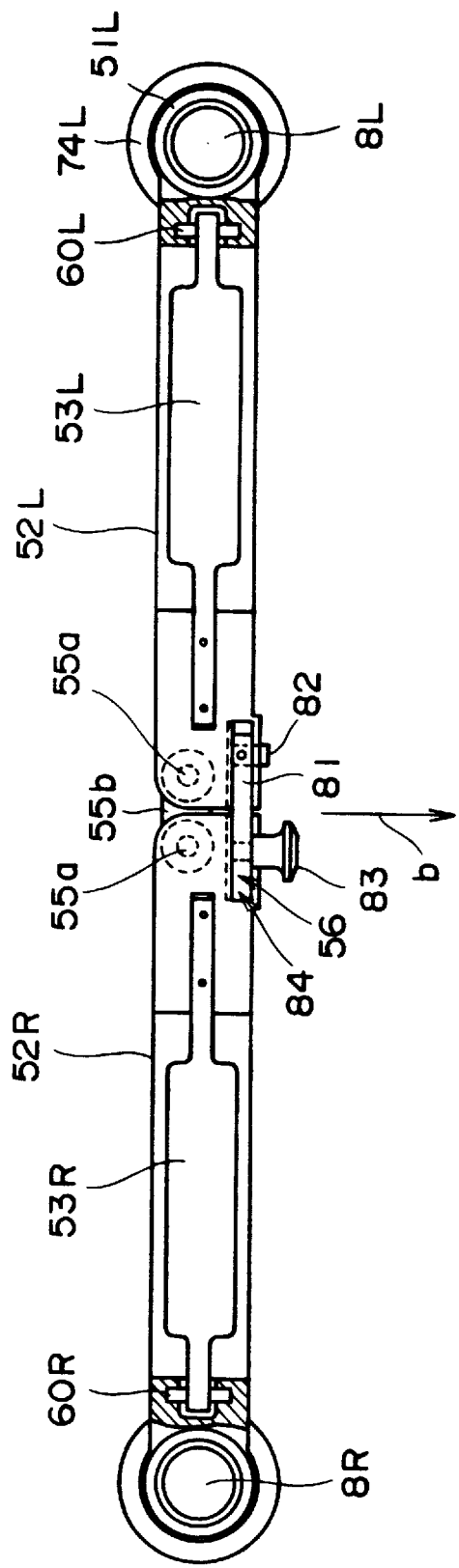
FIG. 7 is a front view of the manipulating apparatus shown in FIG. 6.

The parallel attitude of the frames 52R and 52L of the manipulating units 4R and 4L relative to the ground is maintained by means of a latch member 56 (FIGS. 6 and 7).

By releasing the latch 56, the frames of the manipulating units 4R and 4L are pivoted downward about the shafts 55a and, thus, folded.

The displaceable grips 53R and 53L are grasped by hands for moving the wheelchair forth and back. The grips 53R and 53L extend in parallel with the ground surface and perpendicular to the direction of movement of the wheelchair. This makes it possible for a person to easily handle the displaceable grips 53R and 53L, regardless of his height. The respective ends (outer ends) of the grips 53R and 53L nearer to the handle bars 8R and 8L are pivotally mounted to the frames 52R and 52L by means of shafts 60R and 60L, respectively, so that the grips 53R and 53L are pivotable in a plane parallel to the ground surface. The inner ends of the displaceable grips 53R and 53L are coupled to the manual driving force sensing units 54R and 54L, respectively. Since the displaceable grips 53R and 53L are disposed to span the handle bars 8R and 8L, the person manipulating the wheelchair can grip any portions of the grips 53R and 53L. Because the displaceable grips do not extend beyond the handle bars 8R and 8L, they do not increase the size of the resulting motor-driven wheelchair.

The manual driving force sensing units 54R and 54L include displacement sensing sections 61R and 61L, which may be, for example, potentiometers, for detecting the amounts of displacement of the respective grips 53R and 53L, and producing electrical signals corresponding to the amounts of displacement of the grips.

The displacement sensing sections 61R and 61L are linked with the inner ends of the respective grips 53R and 53L. The displacement sensing sections 61R and 61L produce individual electrical signals for the respective driving arrangements in the wheels 1R and 1L. Since the right and left manipulating units 4R and 4L are independent of each other, the driving forces for the wheels 1R and 1L can be independently changed in accordance with the manual driving forces exerted to the manipulating units 4R and 4L, in order to make the wheelchair turn its course.

The manual driving force sensing units 54R and 54L also include elasticity sections 62R and 62L, respectively, which produce repulsive forces against the compressive forces exerted by the inner ends of the displaceable grips 53R and 53L when they are displaced.

Figure 10:
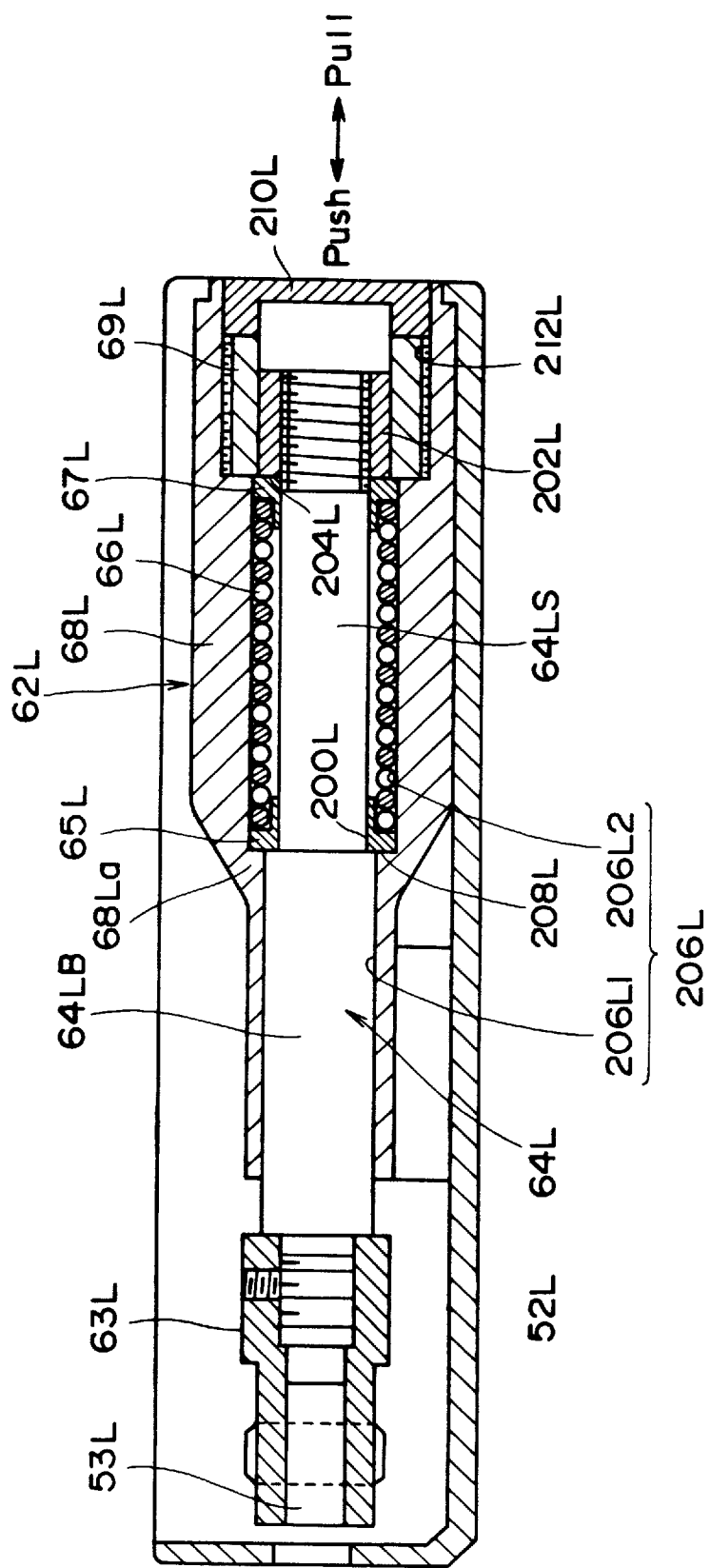
FIG. 10 is a cross-sectional view along the line X—X in FIG. 6.

As shown in FIG. 10, which shows a cross-section of the left elasticity section 62L, the inner end of the displaceable grip 53L is linked with a rod 64L by means of a connector 63L.

The rod 64L extends in parallel with the handle bar 8L and is inserted into a housing 68L in such a manner that it can move to and fro in the direction in parallel with the lateral sides of the chair body 7. The rod 64L has a larger diameter portion 64LB extending from its one end and a smaller diameter portion 64LS integral with the portion 65LB with a shoulder 200L between them. A cylindrical nut 202L having an outer diameter larger than the diameter of the portion 64LS is screwed over the tip end of the smaller diameter portion 64LS. Thus, the cylindrical nut 202L provides a shoulder 204L. Spring shoes 65L and 67L are disposed in contact with the shoulders 200L and 204L, respectively. Elastic means, such as a coil spring, 66L is fitted over the smaller diameter portion 64LS, with its opposite ends contacting with the spring shoes 65L and 67L.

The rod 64L is placed in a bore 206L formed to extend longitudinally through the housing 68L. The bore 206L includes a first bore portion 206L1 through which the larger diameter portion 64LB of the rod 64L can move to and fro, and a second bore portion 206L2 contiguous to the first portion 206L1, with a shoulder 208L formed therebetween. The spring shoe 65L is contacting with the shoulder 208L. A cylindrical nut 69L, through which the nut 202L can slide, is screwed into a threaded bore portion 212L which is contiguous to the second bore portion 206L2. The spring shoe 67L is in contact with the inner end of the nut 69L. A cap 210L is fitted into the bore portion 212L and is in contact with the outer end of the nut 69L. The housing 68L is secured to the frame 52L.

In the state of the elasticity section 62L as shown in FIG. 10, the rod 64L moves forward, i.e. toward the cap 210L, when the inner end of the displaceable grip 53L is pushed toward the housing 68L by manual driving force applied thereto by a person manipulating the wheelchair. Since the spring shoe 67L is restrained from moving by the nut 69L, the end of the coil spring 66L fixed. The other spring shoe 65L is pushed forward by the shoulder 200L, which makes the end of the coil spring 66L resting on the spring shoe 65L move. As a result, the coil spring 66L is compressed, and repulsive force corresponding to the compressive force is generated. Thus, as will be described in greater detail later, the wheelchair body 7 moves forward in accordance with the magnitude of the manual driving force applied to the grip 53L.

On the other hand, if manual driving force is applied to pull the inner end of the grip 53L backward, i.e. away from the housing 68L, the rod 64L is retracted backward. In this case, because the spring shoe 65L is restrained from moving by the shoulder 208L between the bore portions 206L1 and 206L2, the end of the coil spring 66L in contact with the spring shoe 65L is fixed. The other spring shoe 67L is in contact with the shoulder 204L and pushed backward by the shoulder 204L, which makes the coil spring 66L move backward. Thus, the coil spring 66L is compressed and produces a corresponding repulsive force, and the wheelchair moves backward in accordance with the magnitude of the manual driving force applied to the grip 53L.

Although the details of the right manual driving force sensing unit 54R are not shown, its structure and operation are similar to the structure and operation of the left manual driving force sensing unit 54L. Reference numerals with a letter "R" at the end of each reference numeral denote corresponding components with the same reference numerals with a letter "L" at the end.

Figure 8:
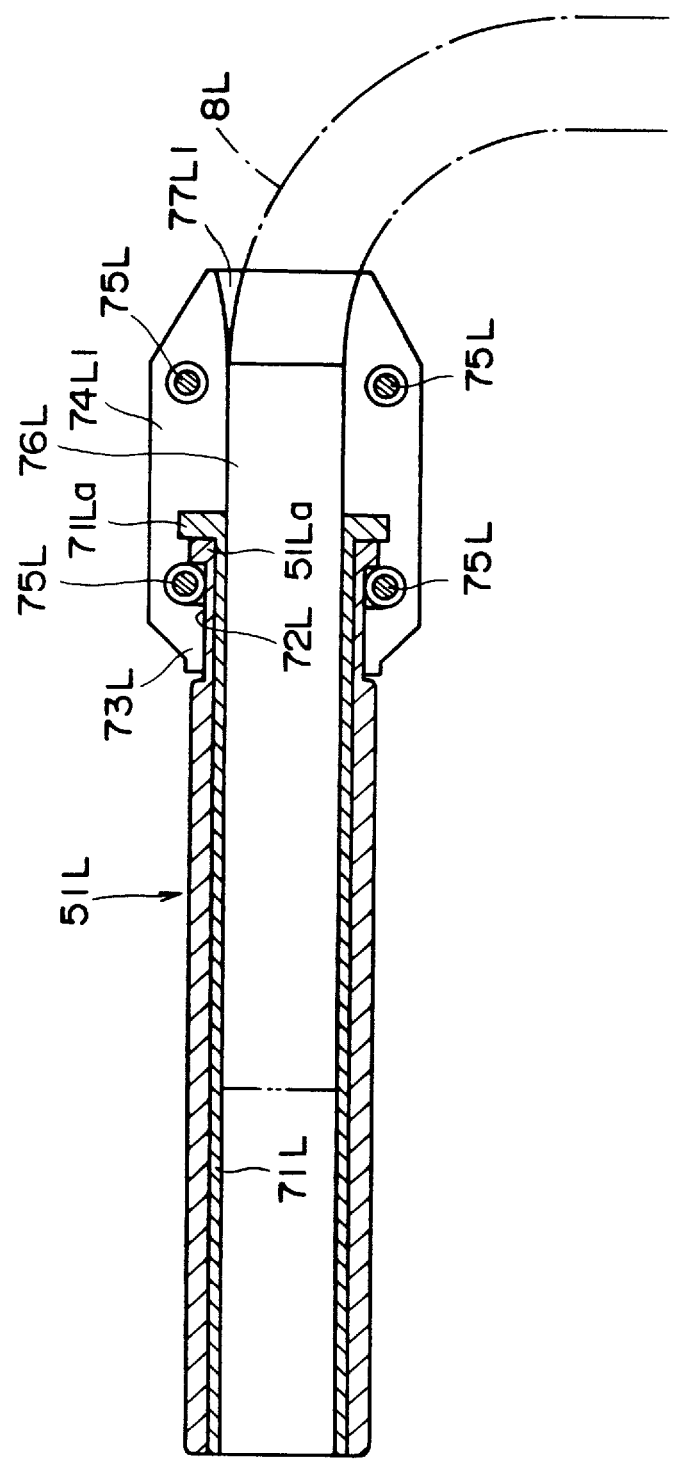
FIG. 8 is a cross-sectional view along the line VIII—VIII in FIG. 6.

Now, referring to FIG. 8, a sleeve 71L is fitted over the handle bar 8L and secured to it. The mount 51L is fitted over the sleeve 71L in such a manner that it can rotate about the sleeve 71L. The sleeve 71L has a uniform outer diameter over its length, so that the mount 51L can turn about the sleeve 71L even when the outer diameter of the handle bar 8L is not uniform. The forward end 51La of the mount 51L abuts a flange 71La formed at the forward end of the sleeve 71L. An annular recess 72L is formed in a portion near the forward end 51La of the mount 51L.

Clamping members 74L1 and 74L2 (FIGS. 6 and 8) have a semi-circular grooves 77L1 and 77L2 in the inside surfaces thereof. (Only the clamping member 74L1 and its groove 77L1 are shown in FIG. 8.) The clamping members 74L1 and 74L2 have their semi-circular grooves fitted over the handle bar 8L, and then coupled together by means of bolts 75L. In the inner surfaces of the semi-circular grooves 77L1 and 77L2 of the clamping members 74L1 and 74L2, semi-circular grooves are formed so that the flange 71La of the sleeve 71 and the front end 51La of the mount 51L are placed therein. Also, each of the clamping members 74L1 and 74L2 has a ring-like portion 72L formed in the inner surface. The ring-like portion 72L is fitted in the recess 72L in the mount 51L.

Thus, the mount 51L is coupled with the handle bar 8L and is rotatable about the sleeve 71L, so that it does not interfere with the folding of the wheelchair.

The mount 51R is mounted on the handle bar 8R in the same manner as the mount 51L. Reference numerals with a letter "R" at the end of each reference numeral denote corresponding components with the same reference numerals with a letter "L" at the end.

Now, reference is to be made to FIG. 7. As shown, the inner legs of the frames 52R and 52L of the manipulating units 4R and 4L are supported pivotally about the handle bars 8R and 8L by means of the shafts 55a of the hinges 55. Accordingly, the handle bars 8R and 8L are pushed inward to fold the wheelchair, the shafts 55a of the hinges 55 move downward as indicated by an arrow b in FIG. 7. Accordingly, the manipulating units 4R and 4L do not prevent the folding of the wheelchair.

In the use of the wheelchair, the alignment of the frames 52R and 52L is maintained by means of the latch 56, so that the manipulating units 4R and 4L can be operated stably. The latch 56 includes a plate 81 pivotable about a pin 82 disposed on one of the frames, on the frame 52L in the example shown in FIG. 7. A knob 83 is attached to the plate 81. The plate 81 is rotated by means of the knob 83 to override a bank 84 into a recess in the frame 52R. The bank 84 prevents the plate 81 from going out of the recess if the plate 81 is forced to rotate out of the recess. In the state shown, the frames 52R and 52L are maintained in alignment with each other and are in parallel with the ground surface by means of the plate 81 of the latch 56. In this state, if the knob 83 is gripped by a hand and is pulled backward or away from the chair body 7, the plate 81 is pulled to override the bank 84 and disengaged from the frame 52R, so that the frames 52R and 52L are folded over.

As shown in FIG. 6, two light-emitting diodes (LED's) 85R and 86R are mounted on the frame 52R, and two LED's 85L and 86L are mounted on the frame 52L. The LED's 85R and 85L indicate the turning on or off of the power supply, while the LED's 86R and 86L indicate the amount of power left in the respective batteries 41R and 41L. Signal lines for the displacement sensing sections 61R and 61L, and the LED's 85R, 86R, 85L and 86L are disposed along the handle bars 8R and 8L on the chair body side. The locations of the LED's 85R and 85L are displaced relative to each other, and also the locations of the LED's 86R and 86L are displaced relative to each other so that they do not interfere with each other when the wheelchair is folded.

The manipulating units 4R and 4L are mounted on the handle bars 8R and 8L in the following manner.

The sleeves 71R and 71L are fitted over the handle bars 8R and 8L, respectively, and, then, the mounts 51R and 51L of the manipulating units 4R and 4L are fitted over the sleeves 71R and 71L, respectively, as shown in FIG. 8. The clamping members 74R1 and 74R2 and 74L1 and 74L2 are placed over the handle bars 8R and 8L, respectively, and secured to each other by the bolts 75. Thus, the mounts 51R and 51L are rotatably supported at the recesses 72R and 72L by the ring-like portions 73R and 73L of the clamping members. When a person manipulating the wheelchair pushes and pulls the wheelchair by means of the grips 53R and 53L, electrical signals corresponding to the forces applied to the grips 53R and 53L by the person are generated and supplied through the signal lines 23R and 23L. As shown in FIG. 1, the signals lines 23R and 23L are connected to the signal lines 22R and 22L through the connectors 24Ra and 24Rb and the connectors 24La and 24Lb, respectively.

Electric circuits of the manipulating units 4R and 4L and the units in the wheels 1R and 1L are described with reference to FIGS. 11 through 15.

As shown in FIG. 11a, the control units 42R and 42L include respective controls 91R and 91L and respective drivers 92R and 92L. The drivers 92R and 92L control the motors 35R and 35L in such a manner that the motors 35R and 35L generate driving forces in accordance with signals supplied from the controls 91R and 91L thereto, respectively. The controls 91R and 91L provide such control signals to the drivers 92R and 92L as to drive the motors 35R and 35L in accordance with the following equation.

$$(Hc+Mc-Th) \times \alpha = Mm$$

where Hc represents a current manual driving force applied by the person manipulating the wheelchair, Hc represents a current motor-driving force, Th represents a threshold value, Mm represents a modified or renewed motor-driving force, and α represents a value within a range expressed as $0 < \alpha \leq 1$, which is a factor representing the ratio of Mm to (Hc+Mc−Th). When the value (Hc+Mc−Th) is negative, Mm is made equal to zero.

For instance, when α=1 and Th=a, the motor-driving force is not generated until Hc exceeds a (Hc>a), as shown in FIG. 11b, and, therefore, until Hc exceeds a, the total driving force for the wheelchair is provided only by the manual driving force applied by the manipulating person, as indicated by the broken line in FIG. 11b. When He becomes slightly larger than a and is maintained at that value, the motor-driving force increases as indicated by the solid line in FIG. 11b.

When α=1 and a=5, for example, Mm continues to be zero until He exceeds 5. However, when Hc becomes slightly larger than 5, e.g. 5.1, Mm becomes 0.1. Then, because Hc equals to 5.1 and Mc equals to 0.1, Mm becomes 0.2. In this way, Mm increases to the value corresponding to the maximum driving force of the motor. Accordingly, the person manipulating the wheelchair need not increase his manual driving force in order to increase the total driving force to be applied to the wheelchair. After Mm starts increasing, Mm is equal to Mc by maintaining Hc equal to Th. In other words, once the manual driving force is caused to exceed the threshold value Th, all of the driving force above the exerted manual driving force is provided by the motor 35R, 35L by keeping the manual driving force at a constant value equal to or greater than the threshold value Th.

As α becomes smaller from 1 toward 0, the rate of increase of the increase of the renewed motor-driving force Mm decreases from the one for α=1.

The threshold Th and the factor α can be independently set through setting sections 93R and 93L described hereinafter.

Figure 12:
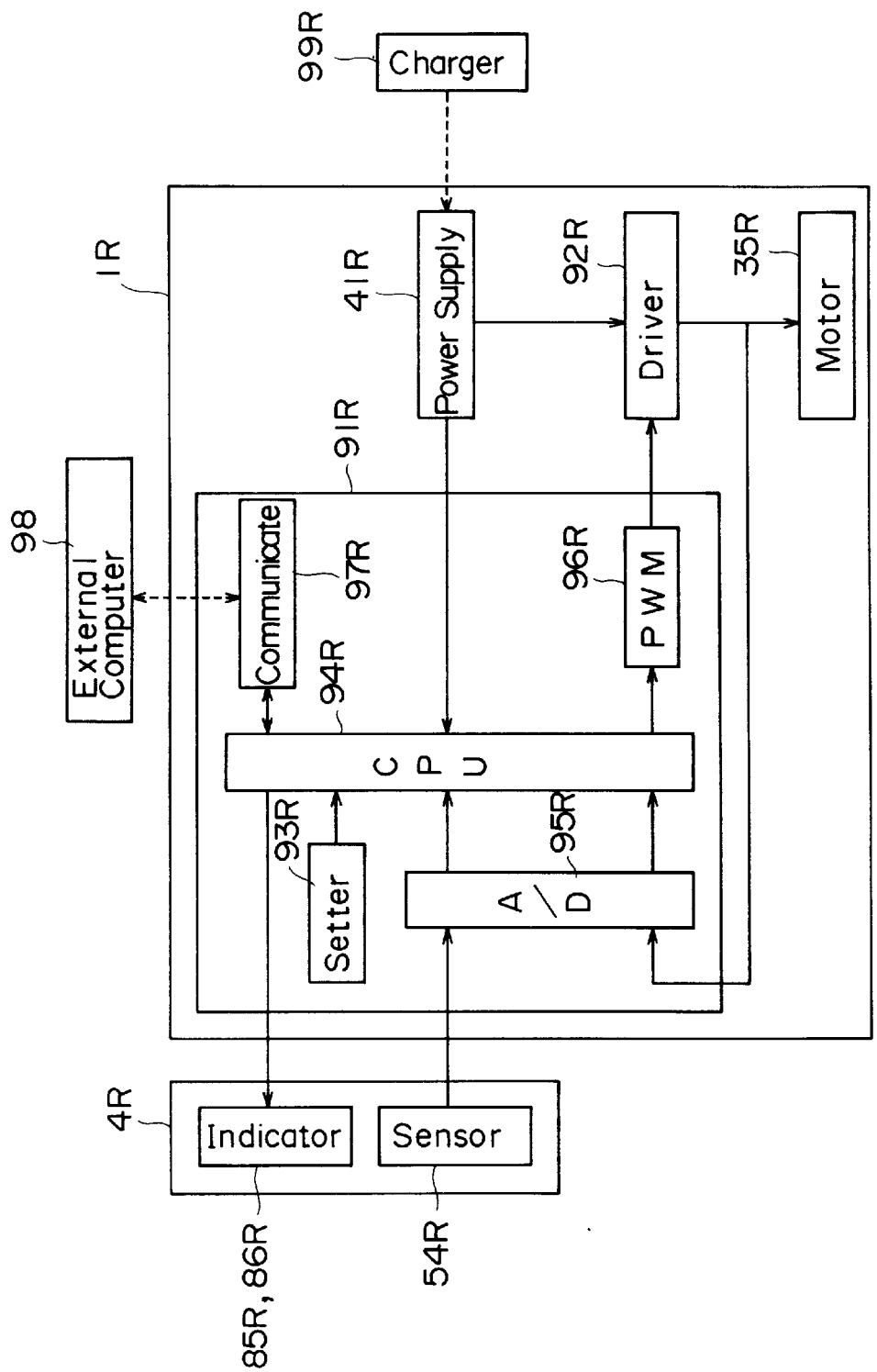

Referring to FIG. 12, the setting section 93R is disposed in the control 91R. (Although only the right wheel 1R and its associated manipulating unit 4R are shown, the description is also applicable to the left wheel 1L and its associated manipulation unit 4L.)

At appropriate locations on the surface of the control unit 42R on the wheel 1R shown in FIG. 4, means for setting the threshold value Th and the factor α, dip switches or thumbwheels are disposed.

Through these switches or thumbwheels, the threshold values Th and the factors α can be set independent from each other for the respective wheels. The setting section 93R is connected to a CPU 94R in the control 91R. A signal from the manual driving force sensing unit 54R is applied via an analog-to-digital (A/D) converter 95R to the CPU 94R, which, in turn, provides a desired signal to the driver 92R through a PWM circuit 96R. It is arranged that an external computer 98 for a communication unit 97R which is connected to the CPU 94, and a charger 99R for charging the battery 41R can be connected to them, when they are required.

If it is desired to set the factor α in common to the wheels 1R and 1L, a dip switch or a thumbwheel for setting the factor α is disposed in one of the setting sections 93R and 93L.

Figure 13:
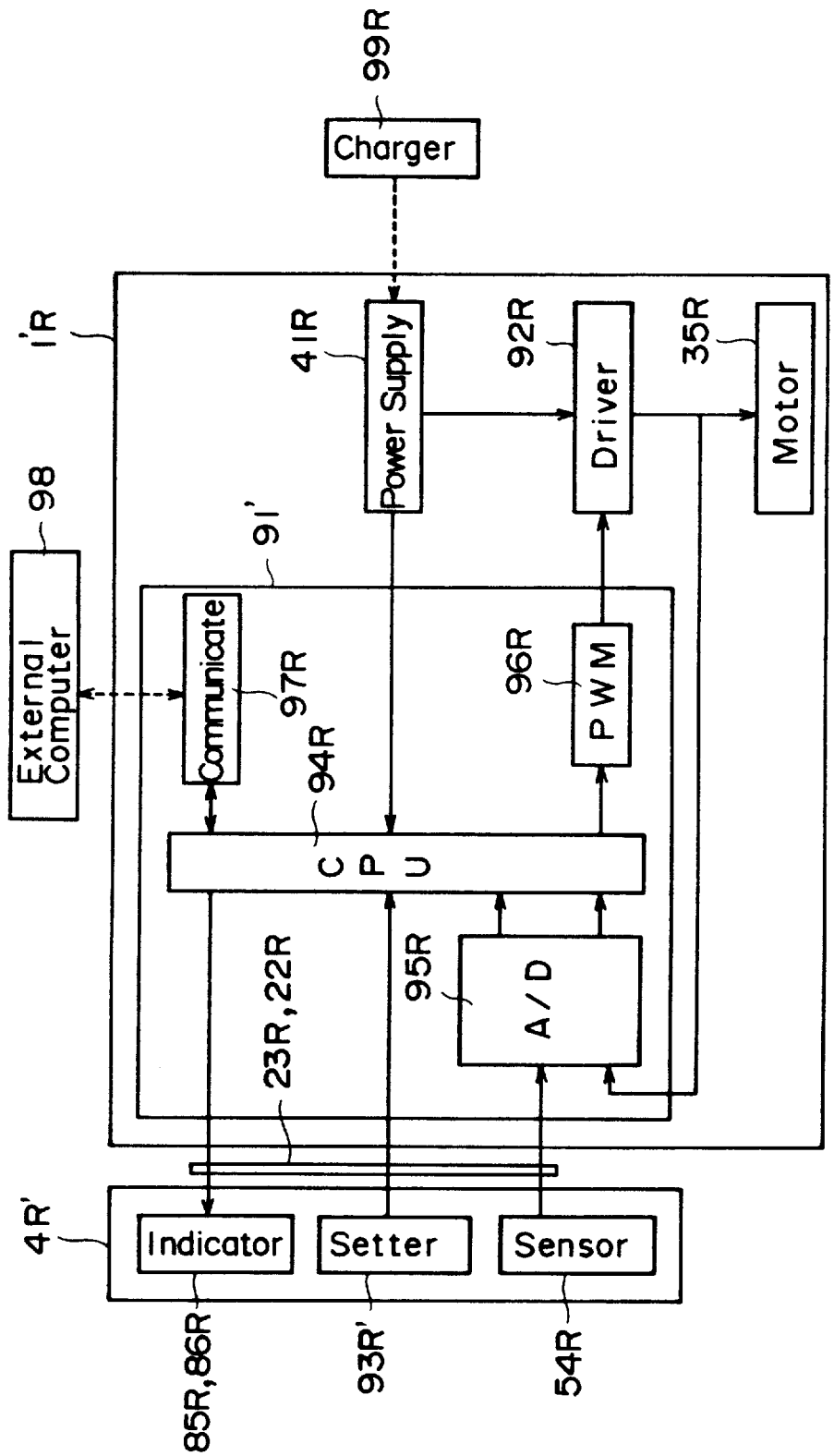
FIG. 13 shows in detail a manipulating apparatus according to another embodiment of the present invention.

As shown in FIG. 13, in place of the setting section 93R, a setting section 93R' may be disposed in the manipulating unit 4R.

More specifically, near the LED's 85R and 86R shown in FIG. 6, dip switches or thumbwheels for setting the threshold value Th and the factor α are disposed as the setting section 93R'. Through these switches or thumbwheels, the threshold value Th and the factor α can be independently set. Electrical signals from the setting section 93R' are transmitted to the CPU 94 through the signal lines 23R and 22R. The other arrangement is the same as shown in FIG. 12. A similar setting section 93L' is disposed in the manipulating unit 4L. In this case, too, if it is desired to set the factor α in common to both wheels 1R and 1L, a dip switch or thumbwheel for setting the factor α is disposed only one of the setting sections 93R' and 93L'.

The effect of the individual setting of the threshold values Th is described with reference to FIGS. 14a, 14b and 14c.

FIG. 14a shows the relationship between current driving forces 30 and manual driving forces, on one hand, and modified driving forces for the right and left wheels, on the other hand, when the threshold values for the respective wheels are set separately. FIGS. 14b is a graph showing the relationship between the running load on the wheelchair and the shares of driving forces for the running load borne by the person manipulating the wheelchair and the motor for the left wheel. FIG. 14b also shows the overall driving force applied to the left wheel 1L. FIGS. 14c is a graph showing the relationship between the running load on the wheelchair and the shares of driving forces for the running load borne by the manipulator and the motor for the right wheel. FIG. 14c also shows the overall driving force applied to the right wheel 1R.

The running load referred to in this specification is a load acting against a force for driving the motor-driven wheelchair at a desired speed. The running load is determined by road conditions, such as the friction resistance between the wheelchair and a road on which the wheelchair is driven and the sloping angle of the road, wind pressure, the weight of a person on the wheelchair, the weight of the wheelchair itself, and the like. As the running load is smaller, the force required to drive the wheelchair is smaller, and as the running load is larger, the driving force required becomes larger. Accordingly, the overall driving force can be defined as a force required for driving a wheelchair which is the sum of a manual driving force and a motor-driving force for a running load. Thus, the overall driving force is directly related to the running load.

In the example shown in FIG. 14a, a small threshold value a1 is set for the left wheel 1L, while a larger threshold value a2 is set for the right wheel 1R. As shown in FIG. 1b, the motor 35L provides a force for driving the chair body 7 even when the running load is small, and a person manipulating the wheelchair is helped by the motor 35L while the manual driving force given by him is small. For the larger threshold value a2 as shown in FIG. 14c, the motor-driving force is provided by the motor 35R only when the running load becomes large, so that the person who manipulates the wheelchair is helped by the motor 35R when the driving force applied by him becomes large.

By the use of switches or thumbwheels for separately setting the threshold values a1 and a2 for the manual driving force sensing units 54L and 54R for the left and right wheels, differences, if any, between manual driving forces as applied to the left and right hand wheel can be offset. If a person on the wheelchair, who is driving the wheelchair by means of hand rims on the wheels, is handicapped in that the power of his one arm is smaller than that of the other arm, so that different manual driving forces are applied to the wheels, the wheelchair can be driven straightforward by appropriately setting the threshold values for the respective wheels. Of course, even if the strength of one arm of a helper who manipulates the wheelchair by means of the grips 53R and 53L is different from the strength of the other arm, the wheelchair can be driven appropriately.

The effects of different values of the factor $\alpha$ are described with reference to FIGS. 15a through 15d. The same value of $\alpha$ may be set in common to the right and left wheels 1R and 1L, or individual values of $\alpha$ may be set for the two wheels.

FIGS. 15a through 15d show an example in which the same $\alpha$ is set in common to the wheels 1R and 1L.

Figure 15A:
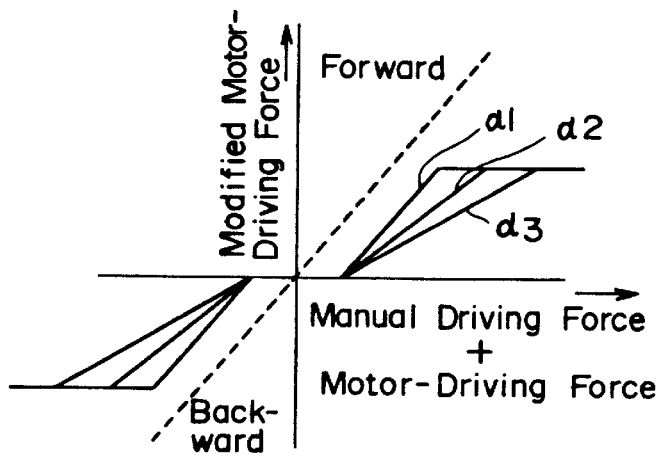
FIG. 15a is a graph showing a relationship between the sum of a current manual-driving force and a current motor-driving force, and a renewed motor-driving force, when different factors are set for right and left side wheels of a motor-driven vehicle.

FIG. 15a shows the relationship between the sum of a manual driving force and a motor-driving force and a modified motor-driving force for each of $\alpha 1$, $\alpha 2$, and $\alpha 3$ which are set to large, intermediate and small values, respectively. In this example, $\alpha 1=1$, and $1>\alpha 2>\alpha 3>0$.

Figure 15B:
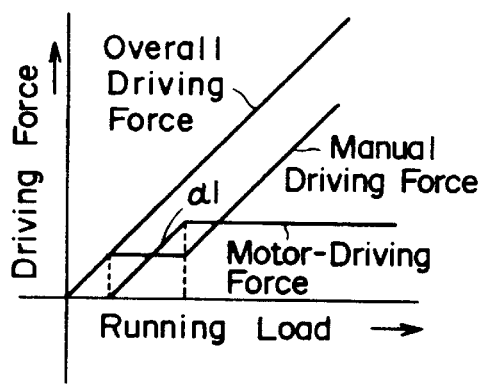
FIG. 15b is a graph showing a relationship between shares of vehicle driving force borne by a human and a motor, and a running load on the vehicle, when a large factor is set.
Figure 15C:
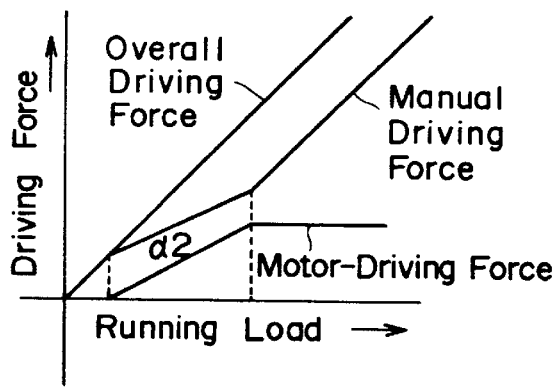
FIG. 15c is a graph showing a relationship between shares of vehicle driving force borne by a human and a motor, and a running load on the vehicle, when an intermediate factor is set.
Figure 15D:
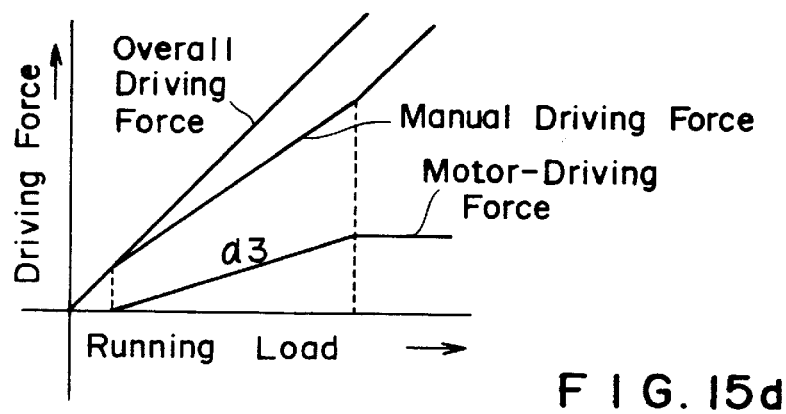
FIG. 15d is a graph showing a relationship between shares of vehicle driving force borne by a human and a motor, and a running load on the vehicle, when a small factor is set.

FIGS. 15b, 15c and 15d each shows the relationships between the running load for each of $\alpha 1$, $\alpha 2$, and $\alpha 3$ on the abscissa axis, and the shares of driving forces borne by the human and the motor and the overall driving force on the ordinate axis.

FIG. 15b shows a case in which the factor is $\alpha 1$, which is a case similar to those shown in FIGS. 11b, 14b and 14c. As described above, once the manual driving force exceeds the preset threshold value Th, the required driving force is supplemented by the motor until the motor-driving force reaches the maximum value available from the motor, with the manual driving force maintained constant. In normal running conditions, it usually does not occur that the running load becomes so large that the motor-driving force reaches its maximum. Accordingly, the person who is manipulating the wheelchair can deal with increase of the running load by exerting only a manual driving force equal to the threshold value Th. Accordingly, the factor $\alpha=1$ is suitable when a person having weak power manipulate the motor-driven wheelchair, utilizing the driving force given by the motors.

In FIG. 15c, the factor $\alpha 2$ is used. When the manual driving force exceeds a preset threshold value Th, the motor-driving force increases with the manual driving force maintained constant. However, the rate of increase of the motor-driving force is smaller than in the case of $\alpha 1=1$. Accordingly, if the running load increases, the manual driving force must be gradually increased in order to obtain the overall driving force corresponding to the increased running load. Thus, the overall driving force for the running load is provided through the cooperation of the manipulating person with the motors.

The factor is FIG. 15d is $\alpha 3$, in which the share of the overall driving force borne by the manipulating person is large, while the share of the motors is small. Thus, the factor $\alpha 3$ is suitable when the person manipulating the wheelchair has a relatively large power, so that the power provided by the battery can be saved for driving the wheelchair.

As described above, if a person who manipulates the wheelchair does not have much strength, the factor $\alpha$ may be set to a large value, such as $\alpha 1=1$, and the wheelchair can be driven with the manual driving force kept at the threshold value Th. On the other hand, if the person who manipulates the wheelchair can afford relatively large manual driving force, the power to be supplied by the motors can be reduced by selecting an appropriate smaller value for the factor $\alpha$, so that the battery power can be efficiently saved.

Imbalance in manual driving force to be applied to the two wheels by the person who manipulates the wheelchair can be compensated by individually setting the factor $\alpha$ for the respective wheels.

FIG. 16 is a perspective view of a manually driven wheelchair which can be modified for mounting the wheels and the manipulating units of the present invention described above.

Each of the drive wheels 101 shown in FIG. 16 has a large diameter of 22 inches or 24 inches. Ring-shaped hand rims 102 having a slightly smaller diameter than the wheels 101 are coupled by attachments (not shown) to the wheels 101 on the outside of the wheels. The wheelchair is driven by means of handle bars 103 by a person, such as a helper, or by means of the hand rims 102 rotated by a person on the wheelchair.

If the person on the wheelchair has sufficient strength in his upper half of his body, he can drive the wheelchair by means of the hand rims 102. However, if his strength in his upper half of the body is insufficient to drive the wheelchair by the hand rims, the above-described wheels with the driving arrangements built therein may be substituted for the wheels 101 with an appropriate operating arrangement for the driving arrangements mounted at a location where the person on the wheelchair can operate it. Thus, the manually driven wheelchair can be easily changed to a motor-driven wheelchair.

If the manually driven wheelchair must be changed to a motor-driven wheelchair which is operated by a person or helper who drives the wheelchair by means of the handle bars 103, the wheels with the above-described driving arrangements are substituted for the wheels 101 and the above-described manipulating units are attached, which results in a power-saving motor-driven wheelchair which is driven through cooperation of human power with motor power. If the manipulating apparatus is of a type as described above in which the sum of a manual driving force and a driving force provided by a motor determines a modified or succeeding motor-driving force, the motor-driven wheelchair can be set to be most easily driven by a person who is currently manipulating the wheelchair, by choosing appropriate values of the threshold Th and the factor $\alpha$.

What is claimed is:

1. A motor-driven vehicle comprising:
   a vehicle body,
   a wheel having an axle with a hollow therein secured to said vehicle body and having a rotary section rotatable about said secured axle;
   a driving arrangement built in said wheel, said driving arrangement including a driving unit mounted on said rotary section and a battery for said driving unit,
   manipulating means mounted on said vehicle body for providing an electrical signal to be supplied to said driving arrangement;

a signal line disposed in said hollow for interconnecting said manipulating means and said driving arrangement, and a slip ring interposed in said signal line and attached to an end of said hollow.

2. The motor-driven vehicle according to claim 1 wherein:

said slip ring is inserted into the end of said hollow and is mounted to said secured axle with a friction member disposed therebetween.

3. The motor-driven vehicle according to claim 2 wherein:

a bearing for supporting a hub included in said rotary section is formed integral with the end of said secured axle into which said slip ring is inserted.

4. The motor-driven vehicle according to claim 1 wherein:

said rotary section includes a hub rotatably mounted on said secured axle, and a plurality of spokes radially equiangularly extending from said hub; and said driving arrangement includes a pair of driving units for driving said wheel to rotate, and a pair of batteries for said driving units, said pair of driving units being disposed in point symmetry with respect to the center of said secured axle in spaces defined by ones of said spokes, said pair of batteries being disposed in point symmetry with respect to the center of said secured axle in spaces defined between ones of said spokes, said locations where said batteries are disposed being at a predetermined angle with respect to the locations where said driving units are disposed.

5. In a motor-driven vehicle including a vehicle body, a plurality of driving arrangements for providing driving forces for a plurality of wheels mounted on said vehicle body, and two handle bars extending from the respective lateral sides of said vehicle body in the direction in which said vehicle body is moved, a manipulating apparatus for providing electrical signals for making said driving arrangements to generate driving forces for driving said wheels, comprising:

mounts fitted over the respective ones of said handle bars;

clamping members for clamping said mounts to said respective handle bars in such a manner that said mounts can be rotated about said handle bars;

frames disposed to extend from the associated ones of said handle bars toward the opposite handle bars;

displaceable grips mounted on the respective ones of said frames, said grips being graspable for a person manipulating said vehicle, said grips being disposed in such a manner that said grips can be displaced in the moving directions of said vehicle body; and manual driving force sensing units coupled to said displaceable grips for generating electrical signals representative of manual driving forces applied to said displaceable grips.

6. The manipulating apparatus according to claim 5 wherein each of said manual driving force sensing units comprises:

a displacement sensing section for detecting the displacement of said displaceable grip and producing said electrical signal representative of the detected displacement; and an elasticity section receiving a compressive force at one end thereof from said displaceable grip when said displaceable grip is displaced, said elasticity section having its other end fixed and generating a repulsive force against said compressive force exerted thereto by said displaceable grip.

7. The manipulating apparatus according to claim 5 wherein said displaceable grips extend perpendicularly to the lateral sides of said vehicle body and in parallel with the ground surface.

8. The manipulating apparatus according to claim 5 wherein each of said displaceable grips is pivotally supported at one end thereof by said frame, said manual driving force sensing section being coupled to the other end of said displaceable grips.

9. The manipulating apparatus according to claim 8 wherein said one end of each of said displaceable grips is on the handle bar side and said other end is within a space between said two handle bars.

10. The manipulating apparatus according to claim 5 wherein a sleeve is interposed between the outer surface of each handle bar and the inner surface of the associated mount fitted over said handle bar, and each of said clamping members clamps the associated mount to said associated handle bar with said sleeve interposed therebetween in such a manner that said mount can be rotated about said handle bar.

11. The manipulating apparatus according to claim 5 wherein a latch member is disposed on one end of one of said frames, said latch member being engageable with one end of the other frame to hold both frames in substantially the same plane as the plane in which said handle bars lie.

12. The manipulating apparatus according to claim 11 wherein a hinge is disposed between adjacent ends of said frames to couple said frames in such a manner that said frames are pivotal about said hinge.

13. The manipulating apparatus according to claim 5 wherein said wheels are mounted on respective lateral sides of said vehicle body;

said driving arrangements provide individual driving forces for the respective ones of said wheels; and said manipulating apparatus produces individual electrical signals for providing individual driving forces for said wheels associated with the respective ones of said handle bars.

14. A motor-driven vehicle comprising:

a vehicle body;

a wheel mounted on said vehicle body;

a manipulating unit mounted on said vehicle body for detecting a manual driving force applied to said vehicle body by a person to drive said vehicle body and producing an electrical signal representative of the detected manual driving force;

a driving unit for providing a driving force corresponding to a drive signal to said wheel for supplementing said manual driving force; and a control unit for applying said drive signal to said driving unit when the electrical signal from said manipulating unit becomes equal to or greater than a predetermined threshold value;

said control unit preparing a new drive signal by adding said electrical signal minus said threshold value to said drive signal being currently applied to said driving unit, then, applying the prepared new drive signal to said driving unit in place of the current drive signal, and repeating the preparation and application of the new drive signal.

15. The motor-driven vehicle according to claim 14 wherein a threshold setting section for setting said threshold value is connected to said control unit.

16. The motor-driven vehicle according to claim 14 wherein:

said wheel is disposed on each side of said vehicle body;

said driving unit is provided for each of said wheels and produce individual driving forces for said respective wheels;

said manipulating unit is provided for each of said wheels and disposed on said vehicle body, said manipulating units producing individual electrical signals representing manual driving forces a person exerts when moving said vehicle body;

said control unit computes said drive signal for each of said manipulating units;

said control unit includes threshold value setting means for each of said wheels for setting said threshold values.

17. The motor-driven vehicle according to claim 14 wherein:

said wheel is disposed on each side of said vehicle body;

said driving unit is provided for each of said wheels and produce individual driving forces for said respective wheels;

said manipulating unit is provided for each of said wheels and disposed on said vehicle body, said manipulating units producing individual electrical signals representing manual driving forces a person exerts when moving said vehicle body;

said control unit computes said drive signal for each of said manipulating units; and said manipulating units each include threshold setting means for setting said threshold value.

18. The motor-driven vehicle according to claim 14 wherein:

said control unit develops a modified drive signal which results from subtracting said threshold value from the sum of said electrical signal and said drive signal and multiplying the resultant difference by a predetermined factor which is a positive value equal to 1 or less; and factor setting means is coupled to said control unit.

19. The motor-driven vehicle according to claim 18 wherein:

said wheel is disposed on each side of said vehicle body;

said driving unit is provided for each of said wheels and produce individual driving forces for said respective wheels;

said manipulating unit is provided for each of said wheels and disposed on said vehicle body, said manipulating units producing individual electrical signals representing manual driving forces a person exerts when moving said vehicle body;

said control unit computes said drive signal for each of said manipulating units; and said control unit is connected to factor setting means for setting said factor for each of said manipulating units.

20. The motor-driven vehicle according to claim 18 wherein:

said wheel is disposed on each side of said vehicle body;

said driving unit is provided for each of said wheels and produce individual driving forces for said respective wheels;

said manipulating unit is provided for each of said wheels and disposed on said vehicle body, said manipulating units producing individual electrical signals representing manual driving forces a person exerts when moving said vehicle body;

said control unit computes said drive signal for each of said manipulating units; and said control unit is connected to threshold setting means for setting said threshold value for each of said manipulating units and to factor setting means for setting said factor for each of said manipulating units.

21. The motor-driven vehicle according to claim 20 wherein said threshold setting means and said factor setting means are disposed adjacent to each other in each of said manipulating units.

* * * * *